United States Patent
Kondou et al.

(10) Patent No.: US 8,670,907 B2
(45) Date of Patent: Mar. 11, 2014

(54) DRIVING SUPPORT DEVICE, DRIVING SUPPORT METHOD AND DRIVING SUPPORT PROGRAM

(75) Inventors: Yoshito Kondou, Anjo (JP); Takayuki Miyajima, Anjo (JP); Atsushi Takeuchi, Anjo (JP)

(73) Assignee: Aisin AW Co., Ltd., Aichi (JP)

( * ) Notice: Subject to any disclaimer, the term of this patent is extended or adjusted under 35 U.S.C. 154(b) by 1127 days.

(21) Appl. No.: 12/430,583

(22) Filed: Apr. 27, 2009

(65) Prior Publication Data

US 2009/0319138 A1 Dec. 24, 2009

(30) Foreign Application Priority Data

Jun. 20, 2008 (JP) ................................ 2008-161615

(51) Int. Cl.
*G06F 17/00* (2006.01)
*G06F 19/00* (2011.01)
*B60K 31/00* (2006.01)
*B60T 8/24* (2006.01)

(52) U.S. Cl.
USPC ................ 701/55; 701/58; 701/65; 701/72; 701/95; 477/120; 180/271

(58) Field of Classification Search
USPC ........... 701/51, 53, 54, 55, 58, 65, 70, 72, 93, 701/94, 95, 400, 408, 409, 423; 340/988, 340/995.24, 995.25, 995.27, 905; 477/34, 477/118–120, 904; 180/170, 197, 271, 282
See application file for complete search history.

(56) References Cited

U.S. PATENT DOCUMENTS

| | | | | |
|---|---|---|---|---|
| 5,864,771 A | * | 1/1999 | Yokoyama et al. | ........... 701/208 |
| 6,067,495 A | * | 5/2000 | Fliearman et al. | ............. 701/55 |
| 6,085,137 A | | 7/2000 | Aruga et al. | |
| 6,906,488 B2 | * | 6/2005 | Hayashi | ....................... 318/567 |
| 7,734,404 B2 | | 6/2010 | Shiiba et al. | |

FOREIGN PATENT DOCUMENTS

| | | |
|---|---|---|
| JP | 11-063211 | 3/1999 |
| JP | 2006-177442 | 7/2006 |

* cited by examiner

*Primary Examiner* — Thomas Tarcza
*Assistant Examiner* — Edward Pipala
(74) *Attorney, Agent, or Firm* — Bacon & Thomas, PLLC

(57) ABSTRACT

A first acceleration gear ratio is acquired for accelerating a host vehicle in a first acceleration zone following a first zone ahead of the host vehicle, and a second acceleration gear ratio is acquired for accelerating the host vehicle in a second acceleration zone following a second zone ahead of the first zone. A control is executed to set the gear ratio of the host vehicle to the first acceleration gear ratio in a first deceleration zone in order to decelerate the host vehicle before entering the first zone. A control is executed to set the gear ratio of the host vehicle to the second acceleration gear ratio when the host vehicle must decelerate with respect to the second zone while traveling in the first acceleration gear ratio.

6 Claims, 14 Drawing Sheets

DRIVING SUPPORT DEVICE, DRIVING SUPPORT METHOD AND DRIVING SUPPORT PROGRAM

INCORPORATION BY REFERENCE

The disclosure of Japanese Patent Application No. 2008-161615 filed on Jun. 20, 2008 including the specification, drawings and abstract is incorporated herein by reference in its entirety.

BACKGROUND OF THE INVENTION

The present invention relates to a driving support device, a driving support method, and a driving support program that support driving of a vehicle.

DESCRIPTION OF THE RELATED ART

In a conventional device for controlling the braking force of a vehicle, a vehicle is decelerated by switching to a gear speed whereby a deceleration closest to a target deceleration, without exceeding the target deceleration, may be obtained, and using an engine brake at the gear speed; insufficient deceleration by the engine brake is compensated by a brake (see Japanese Patent No. 3858952).

SUMMARY OF THE INVENTION

On a road with consecutive specific zones where travel at a specific target vehicle speed is desired, the related art was unable to support smooth acceleration and deceleration between the specific zones.

Namely, the related art focuses on the target deceleration and switches to a gear speed at which a deceleration closest to the target deceleration can be obtained without exceeding the target deceleration. In the case of acceleration after decelerating to the target vehicle speed before the specific zone and then traveling through the specific zone, switching the gear speed in accordance with a target deceleration may result in a gear speed unsuitable for increasing speed at the acceleration phase. As a consequence, smooth acceleration cannot be achieved.

On a road with consecutive specific zones, acceleration and/or deceleration must be performed. However, the timing of acceleration/deceleration and the preferred gear ratio differ depending on road conditions. Accordingly, on a road with consecutive specific zones, smooth acceleration and deceleration cannot be supported between specific zones by only focusing on deceleration before the specific zones and setting a gear ratio.

The present invention was devised to address the above problem, and it is an object of the present invention to provide art that supports smooth acceleration and deceleration between specific zones.

In order to achieve the above object, the present invention acquires a first acceleration gear ratio for accelerating a host vehicle in a first acceleration zone, and acquires a second acceleration gear ratio for accelerating the host vehicle in a second acceleration zone. By executing a control that sets the gear ratio of the host vehicle to the first acceleration gear ratio in a first deceleration zone, the gear ratio of the host vehicle becomes the first acceleration gear ratio before the host vehicle enters the first zone. Therefore, the host vehicle can travel the first zone in the first acceleration gear ratio, and also continue running in the first acceleration gear ratio even after traveling the first zone. However, when the host vehicle must decelerate with respect to the second zone while running in the first acceleration gear ratio, a control is executed that sets the gear ratio of the host vehicle to the second acceleration gear ratio.

In other words, between the first zone and the second zone, even if the host vehicle initially travels in the first acceleration gear ratio and an acceleration in an initially planned first acceleration zone is not complete, the gear ratio of the host vehicle is set to the second acceleration gear ratio when there is a need to decelerate with respect to the second zone. Here, the first acceleration gear ratio is a gear ratio for accelerating the host vehicle in the first acceleration zone that follows the first zone, and the second acceleration gear ratio is a gear ratio for accelerating the host vehicle in a second acceleration zone that follows the second zone. Accordingly, smooth acceleration can be achieved by the first acceleration gear ratio after traveling the first zone, and smooth acceleration can also be achieved by the second acceleration gear ratio after traveling the second zone.

In the present invention, when the first zone exists ahead of the host vehicle and the second zone exists ahead of the first zone, a section for decelerating the host vehicle before the first zone is defined as a first deceleration zone; a section for accelerating the host vehicle after the first zone is defined as a first acceleration zone; and a section for accelerating the host vehicle after the second zone is defined as a second acceleration zone. Information pertaining to the first zone and the second zone is not limited provided that the information is pre-stored in a predetermined storage medium and the driving support device can acquire such information.

The host vehicle is decelerated in a section before the second zone in a manner similar to the deceleration in a section before the first zone. However, the present invention is not limited thereby provided that, in order to perform such deceleration, it can be determined whether deceleration with respect to the second zone is required. Thus, various other configurations may be used in which deceleration before the second zone may be defined (as the second deceleration zone) in a manner similar to that for the first zone, and it may be determined whether deceleration is required depending on the amount of deceleration (deceleration and torque) needed and the vehicle speed in the second zone.

The acceleration gear ratio obtaining unit is not limited provided that the first and second acceleration gear ratios can be acquired for accelerating the host vehicle after traveling the first and second zones, respectively. The first and second acceleration gear ratios are not limited provided that they are gear ratios capable of smoothly accelerating the host vehicle after respective travel through the first and second zones. Accordingly, the first and second acceleration gear ratios should be gear ratios capable of acceleration and continuing travel without generating sudden changes in speed or acceleration and without inducing unstable behavior in the host vehicle.

For example, various other configurations may be used in which the acceleration gear ratio is acquired based on an amount of acceleration for accelerating the host vehicle from the target vehicle speed for traveling each section to the recommended vehicle speed after traveling each section, provided that, for the respective first and second zones, a gear ratio is acquired that enables acceleration from the target vehicle speed to the recommended vehicle speed, and a gear ratio is also acquired that enables travel at a recommended vehicle speed faster than the target vehicle speed when the rotational speed of a drive source is equal to a specific value. In other words, by setting the gear ratio of the host vehicle to the first and second acceleration gear ratios before completing travel through the first and second zones, respectively, acceleration should be possible without changing the gear ratio at the acceleration phase after traveling the first and second zones. Thus, the host vehicle can be smoothly accelerated after traveling the first and second zones.

Note that the gear ratio is also not limited provided that it is at least a sufficient gear ratio required for acceleration to a recommended vehicle speed faster than the target vehicle speed, and the gear ratio may be determined in advance to achieve smoother acceleration. For example, a parameter such as the throttle opening/closing operation at the start of acceleration, or the rotational speed of the host vehicle drive source may be estimated, and a gear ratio or the like that enables the most efficient acceleration based on the estimation can be selected. The required acceleration is not limited provided that it is an acceleration for changing the vehicle speed of the host vehicle from the target vehicle speed to the recommended vehicle speed, and a parameter for evaluating the energy output by the host vehicle in order to change the vehicle speed from the target vehicle speed to the recommended vehicle speed can be used for the required acceleration. For example, an acceleration, torque, engine output, or the like may be used as the parameter.

The first and second zones are not limited provided that they are sections where the host vehicle is preferably decelerated to a target vehicle speed in sections before the respective zones and then accelerated after traveling the zones at the target vehicle speed. The first and second zones may also be a curve zone or a zone with a grade of a predetermined shape. Furthermore, the first and second target vehicle speeds are not limited so long as they are preferred vehicle speeds for traveling the first and second zones, respectively, and are set in advance. In the example of a curve zone, a configuration may be adopted where a constant speed is set as the target vehicle speed, since traveling a zone with a constant radius in the curve zone at a constant speed is preferable. Regarding a road with a grade, wherein the first and second zones are set as zones that include a grade, a configuration may be adopted where the target vehicle speed is defined as decelerating before a start point of a downgrade to a target vehicle speed that is preferred for traveling the downgrade section.

The gear ratio control unit is not limited provided that it is capable of executing a control for setting the gear ratio of the host vehicle to the second acceleration gear ratio while the host vehicle travels in the first acceleration gear ratio. Namely, although the host vehicle runs in the first acceleration gear ratio after traveling through the first zone, if the host vehicle approaches the second zone while traveling in a section following the first zone, smooth acceleration cannot be achieved after traveling the second zone unless the acceleration after traveling the second zone is focused on and the gear ratio shifted to the second acceleration gear ratio. Hence, even during travel through the first acceleration zone, the gear ratio is set to the second acceleration gear ratio in line with acceleration after traveling the second zone at the point where deceleration with respect to the second zone becomes necessary. Note that setting of the gear ratio is not limited so long as the setting is performed for a gear shift portion (e.g. a stepped transmission with a torque converter) mounted in the host vehicle. Namely, setting of the gear ratio is not limited provided that the gear ratio is set in accordance with an instruction of a gear ratio for the gear shift portion, wherein, based on the instruction, the gear shift portion switches to the instructed gear ratio.

For the configuration that sets the target vehicle speed, the acceleration zone, and the recommended vehicle speed for the respective first and second zones, a configuration may also be adopted that corrects the parameters associated with each zone depending on the need for deceleration while traveling in the first acceleration gear ratio. Namely, when deceleration is required with respect to the second zone while running in the first acceleration gear ratio after traveling the first zone, the end point of the first acceleration zone and the first recommended vehicle speed are corrected in order to initiate deceleration by switching to the second acceleration gear ratio, instead of accelerating to the initially planned recommended vehicle speed using the first acceleration gear ratio.

More specifically, the first target vehicle speed for traveling the first zone and the first recommended vehicle speed at the end point of the first acceleration zone are acquired in accordance with preset rules, and the first required acceleration is specified based on the first target vehicle speed and the first recommended vehicle speed. The speed for accelerating the host vehicle at the first required acceleration is then specified for each point. Meanwhile, the second target vehicle speed for traveling the second zone is acquired, and the speed for decelerating the host vehicle at a predetermined deceleration and transitioning to the second target vehicle speed at the start point of the second zone is specified for each point. A point of coincidence is then obtained where the speed for accelerating the host vehicle at the first required acceleration and the speed for transitioning to the second target vehicle speed coincide, and the end point of the first acceleration zone is corrected to this point of coincidence. Furthermore, the speed at the point of coincidence is multiplied by a predetermined coefficient and the first recommended vehicle speed is corrected to the product thereof. Moreover, a required acceleration is acquired for accelerating the host vehicle from the first target vehicle speed to the post-correction first recommended vehicle speed within a distance ranging from the end point of the first zone to the post-correction end point of the first acceleration zone. A correction is then performed that sets the required acceleration as a post-correction first required acceleration.

In other words, a point at which the control for changing to the second acceleration gear ratio is specified based on a predetermined deceleration, aid newly defining the point at the end point of the first acceleration zone shortens the length of the first acceleration zone compared to before the correction was performed. In addition, the speed assumed at the end point of the first zone newly set in the case of accelerating the host vehicle at the first required acceleration is multiplied by a predetermined coefficient to re-calculate the required acceleration for reaching the first recommended vehicle speed at the post-correction end point of the first acceleration zone, which is set as the first required acceleration. Consequently, the impression received by the driver during travel with consecutive acceleration and deceleration can be fine-tuned. In particular, when the coefficient is less than 1, more gradual acceleration and deceleration can be achieved compared to the case of no correction, which can create the impression of smooth travel. Obviously, even if the coefficient is greater than 1, adjustment of the value makes it possible to vary the impression of the driver, in terms of emphasizing safe, smooth, or sporty driving.

Note that the predetermined deceleration is not limited provided that it is a deceleration for slowing the host vehicle to the second target vehicle speed in the second zone. For example, a configuration may be used that defines the deceleration for slowing the host vehicle as a deceleration of a degree that does not cause the driver discomfort. Obviously in this case as well, the deceleration can be defined using a parameter for evaluating the energy applied to the host vehicle for setting the vehicle speed to the recommended vehicle speed. For example, an acceleration, torque, engine output, or the like may be used as the parameter.

In addition to the gear ratio control, acceleration and deceleration support may also be performed with the driving support device. In other words, a configuration may be used in which an acceleration control unit accelerates the host vehicle from the end point of the first zone to the point at which deceleration is required with respect to the second zone, and decelerates the host vehicle from the point at which deceleration is required with respect to the second zone up to the start point of the second zone. The acceleration and deceleration controls may be implemented by a device for regulating the rotational speed of the drive source (such as a throttle) or a brake control, for example.

Furthermore, the technique for executing a control that sets the gear ratio of the host vehicle to the second acceleration gear ratio while traveling in the first acceleration gear ratio, as in the present invention, can also be applied in the forms of a method and a program. Moreover, the driving support device, the driving support program, and the driving support method, as described above, include various types of embodiments. The present invention may be implemented in a stand-alone driving support device, and it may be implemented through parts used in common with respective components provided in the vehicle. For example, it is possible to provide a navigation device that is equipped with the driving support device described above, and to provide the driving support method and the driving support program as well. The present invention can also be modified as desired, such as by providing a portion of it in the form of software and a portion of it in the form of hardware, for example. The present invention may also be practiced in the form of a storage medium for a program that controls the driving support device. Obviously, such a software storage medium may be a magnetic storage medium, and it may also be a magneto optical storage medium. Furthermore, any storage medium that is developed henceforth can also be considered to be exactly the same.

DETAILED DESCRIPTION OF THE EMBODIMENTS

Embodiments of the present invention will be explained in the order shown below.

Figure 1:
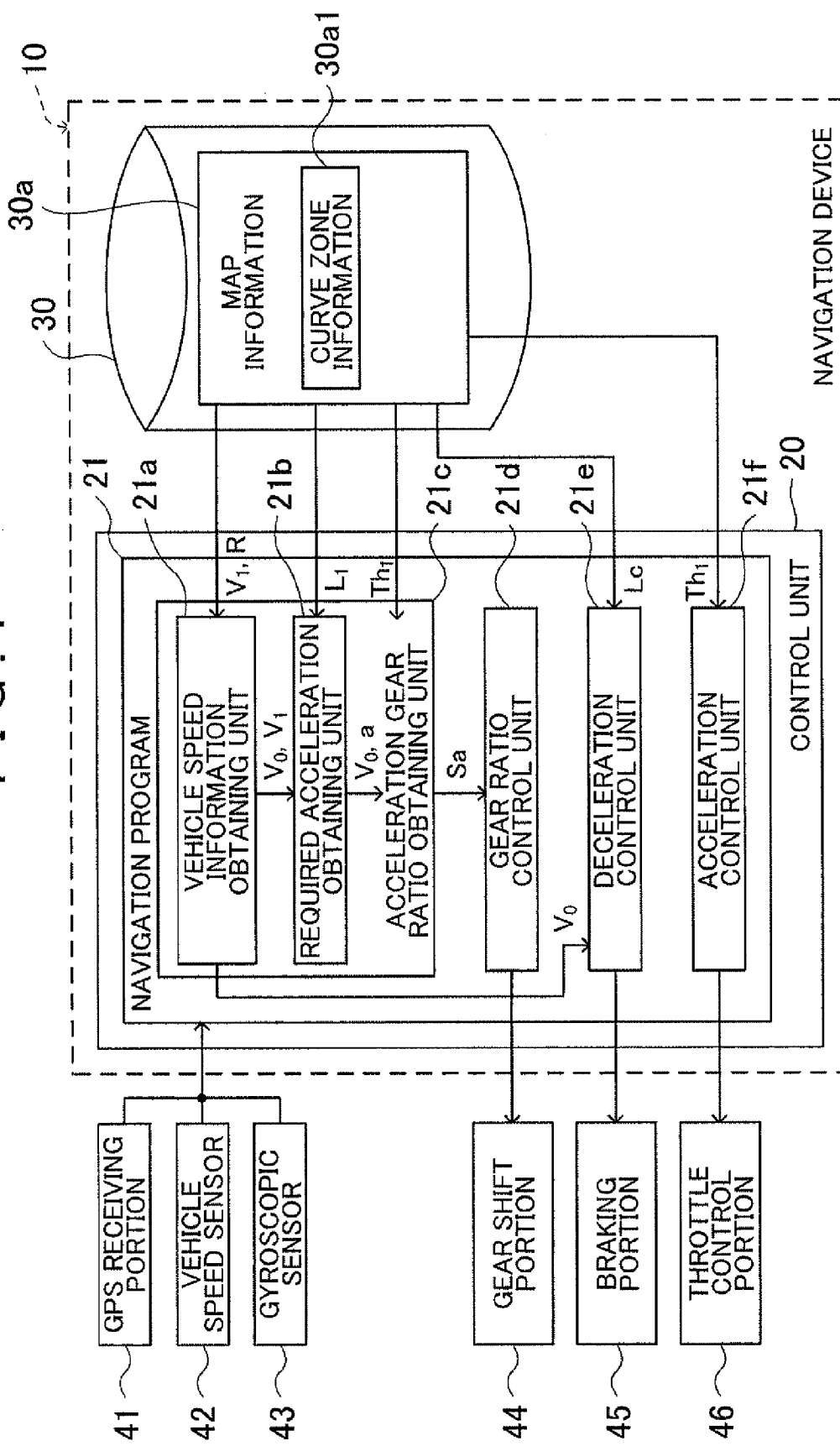
FIG. 1 is a block diagram of a navigation device that includes a driving support device.

(1) Configuration of Navigation Device
(2) Driving Support Processing
   (2-1) Parameter Calculation Processing
   (2-2) Vehicle Deceleration Processing
   (2-3) Deceleration Start Determination Processing
   (2-4) Deceleration Control Processing
   (2-5) Vehicle Speed Restriction Processing
   (2-6) Gear Ratio Selection Processing
   (2-7) Gear Ratio Acquisition Processing
(3) Operation Example
(4) Other Embodiments
   (1) Configuration of Navigation Device FIG. 1 is a block diagram that shows the configuration of a navigation device 10 that incorporates a driving support device according to the present invention. The navigation device 10 includes a storage medium 30 and a control unit 20 that includes a CPU, a RAM, a ROM, and the like. The control unit 20 executes programs that are stored in the storage medium 30 and the ROM. In the present embodiment, one such executable program is a navigation program 21, wherein the navigation program 21 has among its functions a function for setting a gear ratio suitable for acceleration in an acceleration zone and decelerating in a deceleration zone.

A vehicle in the present embodiment (a vehicle in which the navigation device 10 is installed) includes a GPS receiving portion 41, a vehicle speed sensor 42, a gyroscopic sensor 43, a gear shift portion 44, a braking portion 45, and a throttle control portion 46 for implementing the functions of the navigation program 21. The functions of the navigation program 21 are implemented by coordinated operation among the various portions and the control unit 20.

The GPS receiving portion 41 receives radio signals from GPS satellites and outputs, through an interface (not shown), information for computing a current position of the vehicle. The control unit 20 acquires the current position of the vehicle by receiving such information. The vehicle speed sensor 42 outputs a signal that corresponds to the rotational speed of a wheel of the vehicle. The control unit 20 acquires the speed of the vehicle by receiving the signal through an interface (not shown). The gyroscopic sensor 43 outputs a signal that indicates the direction the host vehicle is facing. The control unit 20 acquires the direction in which the host vehicle is traveling by receiving the signal through an interface (not shown). The vehicle speed sensor 42 and the gyroscopic sensor 43 are used to correct the current position of the host vehicle that is specified by the output signal from the GPS receiving portion 41 and the like. The current position of the host vehicle is also corrected as necessary based on the driving path of the host vehicle. Note that various other configurations can also be used to acquire information that indicates the operation of the vehicle. Configurations that use a sensor and a camera to specify the current position of the host vehicle and a configuration that uses GPS signals, the vehicle's path on a map, vehicle-to-vehicle communication, and road-to-vehicle communication to acquire host vehicle operation information may also be used, among others.

The gear shift portion 44 includes a stepped transmission with a torque converter that has a plurality of gear speeds, such as six forward speeds, one reverse speed, and the like. The gear shift portion 44 can transmit the driving force of an engine to the wheel of the vehicle while using the gear ratios that correspond to the various gear speeds to regulate the engine rotational speed. Through an interface (not shown), the control unit 20 outputs a control signal for switching the gear speed, and the gear shift portion 44 can receive the control signal and switch the gear speed. In the present embodiment, as the gear speed increases to a higher gear, such as from the forward first speed towards the forward sixth speed, the gear ratio becomes smaller.

The braking portion 45 includes a device that controls a pressure of a wheel cylinder, which regulates the degree of deceleration realized by a brake that is mounted in the wheel of the host vehicle. The control unit 20 outputs a control signal to the braking portion 45, making it possible to regulate the pressure of the wheel cylinder. Accordingly, the control signal output to the braking portion 45 by the control unit 20 increases the pressure of the wheel cylinder, which increases the braking force generated by the brake and decelerates the host vehicle.

The throttle control portion 46 includes a device that controls a throttle valve that regulates the amount of air supplied to the engine of the host vehicle. The control unit 20 outputs a control signal to the throttle control portion 46 to regulate the opening of the throttle valve. Accordingly, output of the control signal to the throttle control unit 46 by the control unit 20 increases the amount of intake air, which increases the rotational speed of the engine. Note that because the control unit 20 is a component that gives control instructions to the gear shift portion 44 and the throttle control portion 46, the control unit 20 may acquire both a current gear ratio Sn set by the gear shift portion 44 and a current throttle opening Th set by the throttle control portion 46.

By executing the navigation program 21, the control unit 20 performs a route search and the like for the vehicle, based on the output information from the GPS receiving portion 41 and map information, which will be described later. The control unit 20 also performs route guidance and the like through a display portion and a speaker that are not shown in the drawing. In this case, in order to set the gear ratio for the gear shift portion 44 and execute an acceleration control that uses the braking portion 45 and the throttle control portion 46, the navigation program 21 includes an acceleration gear ratio obtaining unit 21c (that includes a vehicle speed information obtaining unit 21a and a required acceleration obtaining unit 21b), a gear ratio control unit 21d, a deceleration control unit 21e, and an acceleration control unit 21f.

Map information 30a that the navigation program 21 uses to perform guidance is stored in the storage medium 30. The map information 30a includes node data that indicate nodes that are set on the roads that the vehicle travels, shape interpolation data for specifying the shapes of the roads between the nodes, link data that indicate connections between the nodes, data that indicate the roads and the features around them, and the like. The map information 30a is used to specify the current position of the host vehicle, to provide guidance to a destination, and the like.

Figure 2:
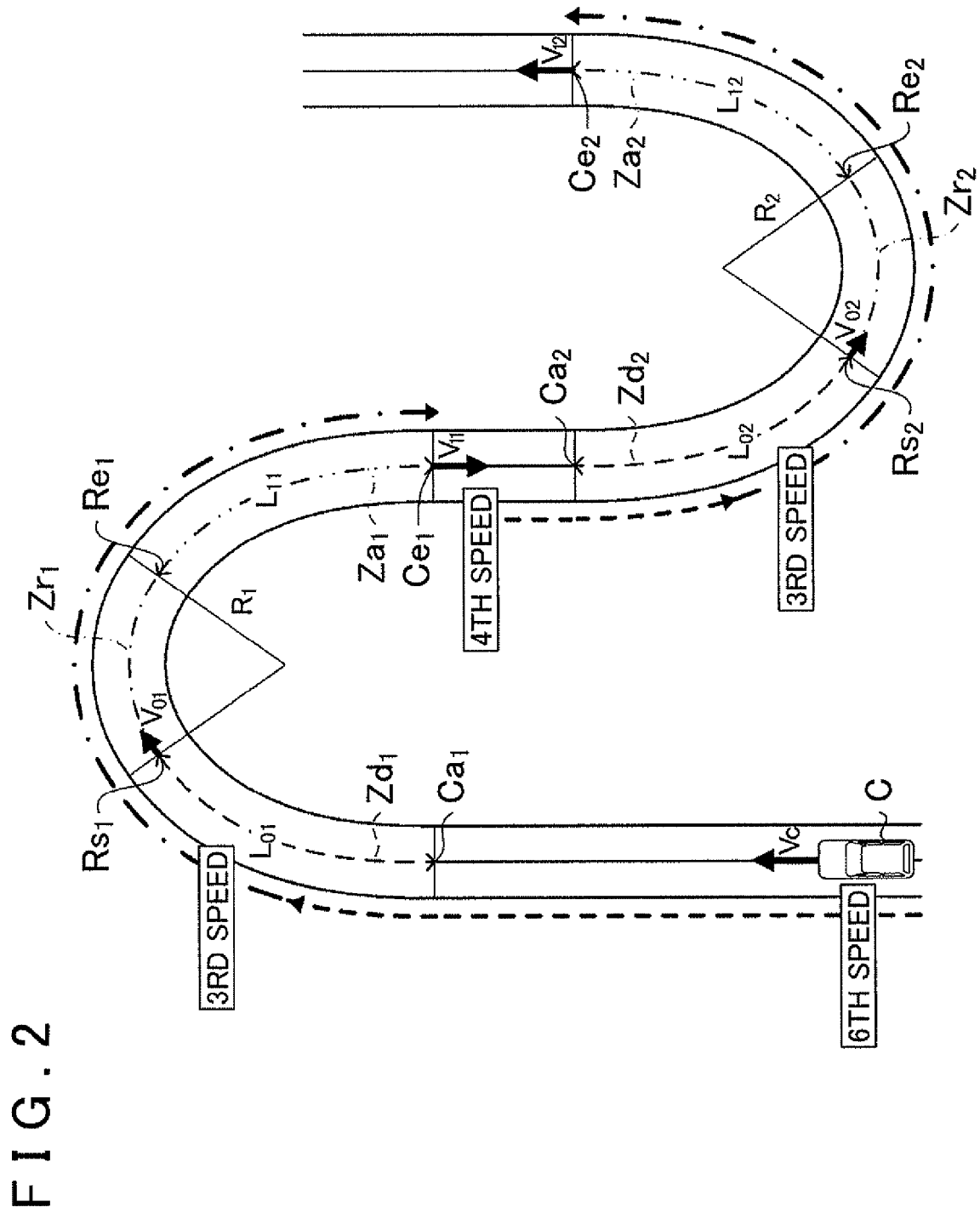
FIG. 2 is a figure that shows an example of a curve zone.

The present embodiment executes a deceleration control before the host vehicle reaches a curve zone (a section with a constant radius), and information indicating the curve zone and the road before and after the curve zone is included in the map information 30a. FIG. 2 is a drawing that shows an example curve zone Zr, and illustrates a situation where a host vehicle C is traveling toward a curve zone $Zr_1$, as indicated by a thin dashed line. Note that a curve zone ahead of the host vehicle C and nearest to the host vehicle C is called a first zone, and the next nearest curve zone to the host vehicle C after the first zone is called a second zone. Also, a "1" as the last digit in numerical subscript added to reference numerals (such as Zr) that indicate sections and points in FIG. 2 and the like refers to sections and points that are related to the first zone, and a "2" refers to sections and points that are related to the second zone.

According to the present embodiment, node data corresponding to a start point Rs of the curve zone Zr is linked to information that indicates the start point Rs of the curve zone Zr, and node data corresponding to an end point Re of the curve zone Zr is linked to information that indicates the end point Re of the curve zone Zr. Furthermore, shape interpolation data that indicates the shape of the road between the start point Rs and the end point Re is data that indicate positions on the arc of the curve zone Zr. Based on the shape interpolation data, it is possible to identify a constant radius R of the curve zone Zr and a vehicle speed (a target vehicle speed $V_0$) for traveling at a constant vehicle speed through a section with the radius R. In the present embodiment, information that indicates the start point Rs and the end point Re of the curve zone Zr, as well as the shape interpolation data between the start point Rs and the end point Re, are referred as curve zone information 30a1.

In a section before the curve zone Zr described above, a deceleration zone Zd (a section indicated by a thin dashed line in FIG. 2) for decelerating before reaching the curve zone Zr is set. According to the present embodiment, a section with a fixed distance before the start point Rs of the curve zone Zr is designated as the deceleration zone Zd, and a point that is a fixed distance from the start point Rs of the curve zone is specified as a start point Ca of the deceleration zone Zd. Note that in the present embodiment, an end point of the deceleration zone Zd coincides with the start point Rs of the curve zone Zr. Based on information that indicates the positions of the start point Ca and the end point Rs of the deceleration zone Zd, it is possible to identify a length $L_0$ of the deceleration zone Zd.

In a section after the curve zone Zr described above, an acceleration zone Za (a section indicated by a thin dashed-two-dotted line in FIG. 2) for accelerating toward a predetermined point after traveling the curve zone Zr (an end point Ce of the acceleration zone Za) is set. According to the present embodiment, a length $L_1$ of the acceleration zone Za is determined depending on the radius R of the curve zone Zr, and the length $L_1$ is set such that the curve zone with a smaller radius R (a smaller target vehicle speed $V_0$ in the curve zone Zr) is accompanied by a longer length $L_1$. Note that in the present embodiment, a start point of the acceleration zone Za coincides with the end point Re of the curve zone Zr.

The data that indicates the end point Ce of the acceleration zone Za is linked to the speed limit at that point, and the speed limit is set as a recommended vehicle speed $V_1$ after traveling through the acceleration zone in the present embodiment. Furthermore, a throttle opening $Th_1$ at the start point Re of the acceleration zone Za for carrying out an acceleration control that will be described later is determined in advance and recorded in the map information 30a. Note that a section for decelerating the host vehicle before the first zone is called a first deceleration zone, and a section for accelerating the host vehicle after the first zone is called a first acceleration zone. Likewise, a section for decelerating the host vehicle before the second zone is called a second deceleration zone, and a section for accelerating the host vehicle after the second zone is called a second acceleration zone.

In the present embodiment, the definitions of points pertaining to the sections as described above apply to each curve zone. Setting of the gear ratio and a deceleration control are carried out in the deceleration zones for the respective curve zones, and the acceleration control carried out in the acceleration zones. However, in the case of consecutive curve zones over a short distance, a process is performed to achieve smooth acceleration between the curve zones. Namely, if the first zone and the second zone are within a close distance to each other and the second deceleration zone $Zd_2$ overlaps with the first acceleration zone $Za_1$, after traveling the first zone the host vehicle must decelerate for the second zone while traveling in a first acceleration gear ratio. Hence, between the first zone and the second zone in the present embodiment, the definitions of vehicle speeds and sections that are related to the first zone and the second zone will be amended as described later.

The vehicle speed information obtaining unit 21a is a module that acquires the target vehicle speed $V_0$ for traveling the curve zone Zr and the recommended vehicle speed $V_1$ for after traveling the curve zone Zr. The vehicle speed information obtaining unit 21a specifies such vehicle speed information by referring to the map information 30a. Namely, the control unit 20 uses the processing of the vehicle speed information obtaining unit 21a to determine the radius R of the curve zone Zr by referring to the curve zone information 30a1 and acquire a vehicle speed for traveling at a constant vehicle speed through a section with the radius R, which is then set as the target vehicle speed $V_0$. For example, a vehicle speed $(Gt \cdot R)^{1/2}$ for traveling at a constant vehicle speed at a preset lateral acceleration Gt (e.g. 0.2 G) is acquired as the target vehicle speed $V_0$. The control unit 20 also acquires the recommended vehicle speed $V_1$ by referring to the map information 30a.

The required acceleration obtaining unit 21b is a module that acquires a required acceleration for increasing the speed of the host vehicle from the target vehicle speed $V_0$ to the recommended vehicle speed $V_1$. Through the process executed by the required acceleration obtaining unit 21b, the control unit 20 specifies the length $L_1$ of the acceleration zone Za based on information that indicates the positions of the start point Re and the end point Ce of the acceleration zone Za and acquires a required acceleration a for accelerating from the target vehicle speed $V_0$ to the recommended vehicle speed $V_1$ within the length $L_1$. Namely, based on the information that indicates the start point Re and the end point Ce of the acceleration zone Za and the positions of intervening shape interpolation points, the length spanning between the start point Re and the end point Ce that follows the shape of the road is acquired as the length $L_1$. The required acceleration a for transitioning from the target vehicle speed $V_0$ to the recommended vehicle speed $V_1$ within the length $L_1$ is acquired as $a=(V_1^2-V_0^2)/(2L_1)$ assuming uniform accelerated motion.

The acceleration gear ratio obtaining unit 21c is a module that acquires an acceleration gear ratio Sa (where Sa equals any one of 1 to 6 (that correspond to the aforementioned forward first to sixth speeds)), which is a gear ratio for running the host vehicle at the required acceleration a. Through the process executed by the acceleration gear ratio obtaining unit 21c, the control unit 20 acquires the throttle opening $Th_1$ by referring to the map information 30a, and determines the gear ratio based on the throttle opening $Th_1$, the required acceleration a, and the target vehicle speed $V_0$. In the present embodiment, the acceleration gear ratio Sa uses a gear ratio that enables the least fuel consumption among the gear ratios capable of generating the required acceleration a in a state where the host vehicle is traveling at the target vehicle speed $V_0$ and the engine rotational speed corresponding to the throttle opening $Th_1$. Note that various other configurations may be adopted here provided that a gear ratio capable of acceleration can be selected without risking instability in the behavior of the host vehicle or sudden changes in speed and acceleration by determining the acceleration gear ratio based on the required acceleration a after traveling each zone.

According to this configuration, the host vehicle can be accelerated from the target vehicle speed $V_0$ to the recommended vehicle speed $V_1$ while using fuel efficiently. Note that for the selection of the gear ratio here, a configuration such as one that prepares a fuel consumption map in advance linked to the engine rotational speed and the throttle opening $Th_1$ and selects the gear ratio on the basis of the fuel consumption map can be employed. Further note that, while an engine rotational speed corresponding to the throttle opening $Th_1$ is assumed here, the rotational speed may obviously be determined based on a statistical value or the like.

The gear ratio control unit 21d is a module that sets the gear ratio of the host vehicle to the acceleration gear ratio Sa in the deceleration zones of the curve zones in order to accelerate after the curve zones. Through the process executed by the gear ratio control unit 21d, the control unit 20 outputs a control signal to the gear shift portion 44 for setting the gear ratio to the acceleration gear ratio Sa at a predetermined timing in accordance with a process procedure that will be described later. The gear shift portion 44 switches the gear ratio to the acceleration gear ratio Sa in accordance with the control signal.

The deceleration control unit 21e is a module that decelerates the vehicle speed of the host vehicle so as to become the target vehicle speed $V_0$ before the host vehicle reaches the curve zone Zr. Through the process executed by the deceleration control unit 21e, the control unit 20 performs a feedback control such that the vehicle speed at the start point Rs of the curve zone Zr becomes the target vehicle speed $V_0$. Namely, the target vehicle speed $V_0$ is obtained and the map information 30a is referenced to obtain as the length Lc the length spanning between the current position of the host vehicle and the end point Rs that follows the shape of the road based on information that indicates the current position of the host vehicle, the end point Rs of the deceleration zone, and the positions of shape interpolation points therebetween.

A required deceleration Gr (a negative acceleration when the traveling direction of the host vehicle is designated as the positive direction) for transitioning from a current vehicle speed Vc of the host vehicle to the target vehicle speed $V_0$ within the length Lc is acquired as $Gr=(V_0^2-Vc^2)/(2Lc)$ assuming uniform accelerated motion. In the present embodiment, the required deceleration Gr is consecutively obtained, and the deceleration control is initiated when the required deceleration Gr exceeds a predetermined threshold (LimG_h or LimG_L (e.g. 0.2 G) that will be described later). Namely, a deceleration Ge to be generated by an engine brake is acquired based on a current gear ratio Sn set by the gear shift portion 44, and the engine rotational speed at a current throttle opening Th regulated by the throttle control portion 46. The control unit 20 then outputs a control signal to the braking portion 45 for generating a deceleration equivalent to the difference between the required deceleration Gr and the deceleration Ge (Gr−Ge) using a brake. Thus, the brake is operated by the braking portion 45 so as to compensate for the difference between the required deceleration Gr and the deceleration Ge (Gr−Ge).

Note that in the present embodiment, the gear ratio is switched to the acceleration gear ratio Sa while a deceleration operation is performed in the deceleration zone Zd. At such time, switching of the gear ratio ordinarily results in a gear ratio with a larger torque. Therefore, setting the gear ratio to the acceleration gear ratio Sa makes it possible to compensate for the deceleration before reaching the curve zone.

The acceleration control unit 21f is a module for controlling an acceleration after the host vehicle travels the curve zone Zr. Through the process executed by the acceleration control unit 21f, the control unit 20 controls the throttle opening Th such that the vehicle speed transitions from the target vehicle speed $V_0$ to the recommended vehicle speed $V_1$ in the acceleration zone Za spanning the length $L_1$ from the end point Re of the curve zone Zr. Namely, while maintaining the gear ratio to the acceleration gear ratio Sa, the control unit 20 outputs a control signal to the throttle control portion 46 to set the throttle opening to $Th_1$, and regulates the throttle opening $Th_1$ as necessary such that acceleration is subsequently performed at the required acceleration a.

According to the configuration described above, the acceleration gear ratio Sa is set in the phase where the host vehicle is traveling the deceleration zone Zd. Therefore, the acceleration gear ratio Sa that is suitable for accelerating to the recommended vehicle speed $V_1$ is used in the phase where the host vehicle travels the acceleration zone Za, thus enabling smooth acceleration in the acceleration zone Za.

Note that in the present embodiment, acceleration and deceleration are carried out in sequence as described above with regard to the curve zone directly in front of the host vehicle (the first zone); however, for consecutive curve zones over a short distance, the acceleration gear ratio obtaining unit 21c performs the following correction in order to execute a control that considers both the first zone and the second zone. Namely, the acceleration gear ratio obtaining unit 21c acquires a first target vehicle speed $V_{01}$ for traveling the first zone $Zr_1$ and a first recommended vehicle speed $V_{11}$ at an end point $Ce_1$ of the first acceleration zone $Za_1$, and also acquires a second target vehicle speed $V_{02}$ for traveling a second zone $Zr_2$. In addition, the acceleration gear ratio obtaining unit 21c specifies a speed (a change in speed with respect to a position) for accelerating the host vehicle C at a first required acceleration in order to accelerate from the first target vehicle speed $V_{01}$ to the first recommended vehicle speed $V_{11}$ between an end point $Re_1$ of the first zone $Zr_1$ and the end point $Ce_1$ of the first acceleration zone $Za_1$. The acceleration gear ratio obtaining unit 21c also specifies a speed (a change in speed with respect to a position) for decelerating the host vehicle C at a predetermined deceleration (e.g. an acceleration of 0.2 G, which is set as a deceleration for slowing the host vehicle at a degree of deceleration that does not cause the driver discomfort) in order to transition to a second target vehicle speed $V_{02}$ at a start point $Rs_2$ of the second zone $Zr_2$. A point of coincidence is then obtained where the speed for accelerating the host vehicle at the first required acceleration and the speed for transitioning to the second target vehicle speed $V_{02}$ coincide, and the end point $Ce_1$ of the first acceleration zone $Za_1$ is corrected to this point of coincidence.

Namely, a point at which the speed for accelerating the host vehicle at the first required acceleration from the end point $Re_1$ of the first zone $Zr_1$ coincides with the speed for slowing down toward the second zone $Zr_2$ in order to transition to the second target vehicle speed $V_{02}$ is considered to be the point at which deceleration for the second zone $Zr_2$ is required. The distance within which the host vehicle accelerates in the first acceleration zone $Za_1$ is thus shorter in comparison to separately performing acceleration and deceleration for the first zone $Zr_1$ and the second zone $Zr_2$. When accelerating after traveling the first zone $Zr_1$, acceleration is performed so as not to exceed the speed for slowing at a predetermined deceleration toward the second zone $Zr_2$ in order to transition to the second target vehicle speed $V_{02}$. Therefore, acceleration can be performed at the first acceleration gear ratio in order to achieve smooth acceleration in the first acceleration zone $Za_1$ after traveling the first zone $Zr_1$. Furthermore, while accelerating at the first acceleration gear ratio, it is also possible to switch to a second acceleration gear ratio for smooth acceleration in a second acceleration zone $Za_2$. Thus, the host vehicle can be accelerated in a smooth manner using the second acceleration gear ratio after traveling the second zone $Zr_2$.

At the above point of coincidence, the speed for accelerating the host vehicle at the first required acceleration is multiplied by a predetermined coefficient and the first recommended vehicle speed $V_{11}$ is corrected to the product thereof. Note that in the present embodiment, the coefficient is less than 1 and greater than 0, and coefficients of three different magnitudes are defined in advance. The driver selects a coefficient using an interface (not shown), and the selected coefficient is applied in the correction described above. According to the above configuration, in comparison to not performing a correction using a coefficient, it is possible to give the driver an impression of smoother travel with more gradual acceleration and deceleration between the first zone $Zr_1$ and the second zone $Zr_2$. The coefficients with three different magnitudes can be set in order from smallest to largest to correspond with the driver's senses in terms of emphasizing safety, smoothness, sporty driving, and the like. Selecting a coefficient can thus change the driver's impression of travel.

(2) Driving Support Processing

Figure 3:
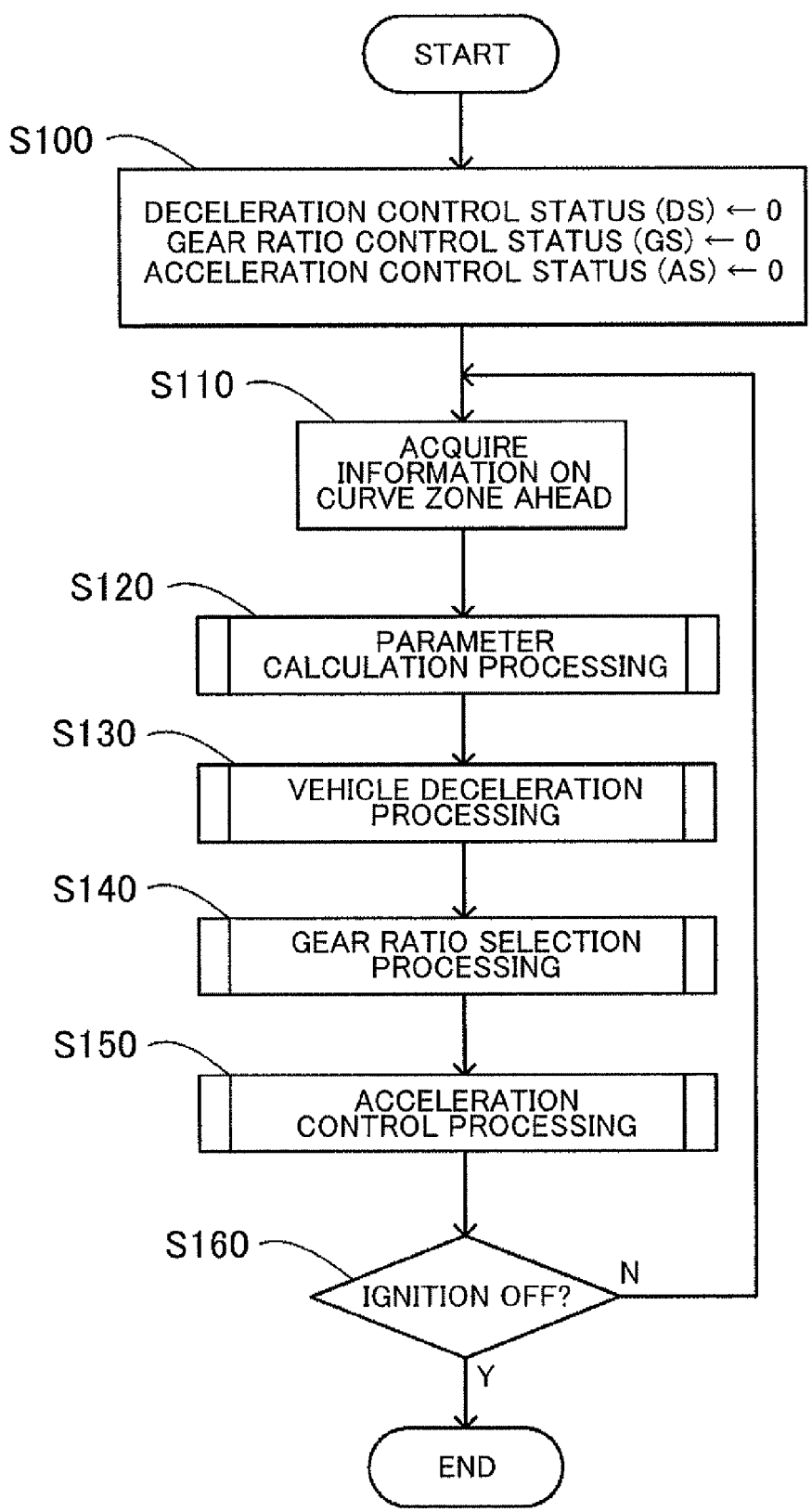
FIG. 3 is a flowchart of the driving support process.

Next, the driving support process that is executed by the navigation device 10 in the configuration described above will be explained. When the navigation program 21 is executed by the navigation device 10, the various portions of the navigation program 21 execute the process that is shown in FIG. 3. A status (called a deceleration control status DS) of the three different types of controls related to the deceleration control, a status (called a gear ratio control status GS) of the three different types of controls related to the gear ratio control, and a status (called an acceleration control status AS) of the two different types of controls related to the acceleration control are provided in the present embodiment, and the control unit 20 initializes variables that specify the deceleration control status DS, the gear ratio control status GS, and the acceleration control status to 0 (S100).

Note that in the present embodiment, DS=0 refers to a state where the vehicle speed is not controlled, DS=1 refers to a state where the vehicle speed is decelerated to the target vehicle speed $V_0$, and DS=2 refers to a state where the vehicle speed is maintained in the curve zone. Likewise, GS=0 refers to a state where the gear ratio is not controlled, GS=1 refers to a state where the process to compute the gear ratio is performed, and GS=2 refers to a state where the process to switch the gear ratio is performed. In addition, AS=0 refers to a state where a control for acceleration is not executed, and AS=1 refers to a state where the vehicle speed is increased to the recommended vehicle speed $V_1$.

Once the deceleration control status DS, the gear ratio control status GS, and the acceleration control status AS are initialized, the control unit 20 acquires information on a curve zone present ahead of the host vehicle (S110). Namely, the control unit 20 specifies the current position of the host vehicle based on the output signals from the GPS receiving portion 41 and the like, then refers to the map information 30a to determine whether a curve zone exists within a predetermined range ahead of the current position. If there is a curve zone, then the control unit 20 acquires the map information 30a that includes the curve zone information 30a1 pertaining to that particular curve zone.

The control unit 20 next performs the parameter calculation process that calculates parameters required for the gear ratio and acceleration controls based on the map information 30a (S120). The control unit 20 subsequently executes the vehicle deceleration process (S130), the gear ratio selection process (S140) and the acceleration control process (S150), and acquires an output signal of an ignition switch (not shown) to determine whether the ignition has been turned off (S160). The process from S110 onward is repeated until it is determined that the ignition has been turned off. Note that in the acceleration control process at S150, the control unit 20 uses the processing of the acceleration control unit 21f to determine whether the acceleration control status AS is 1. If the acceleration control status AS is 1, the control unit 20 controls the throttle opening Th such that the vehicle speed transitions from the target vehicle speed $V_0$ to the recommended vehicle speed $V_1$.

(2-1) Parameter Calculation Processing

Figure 4A:
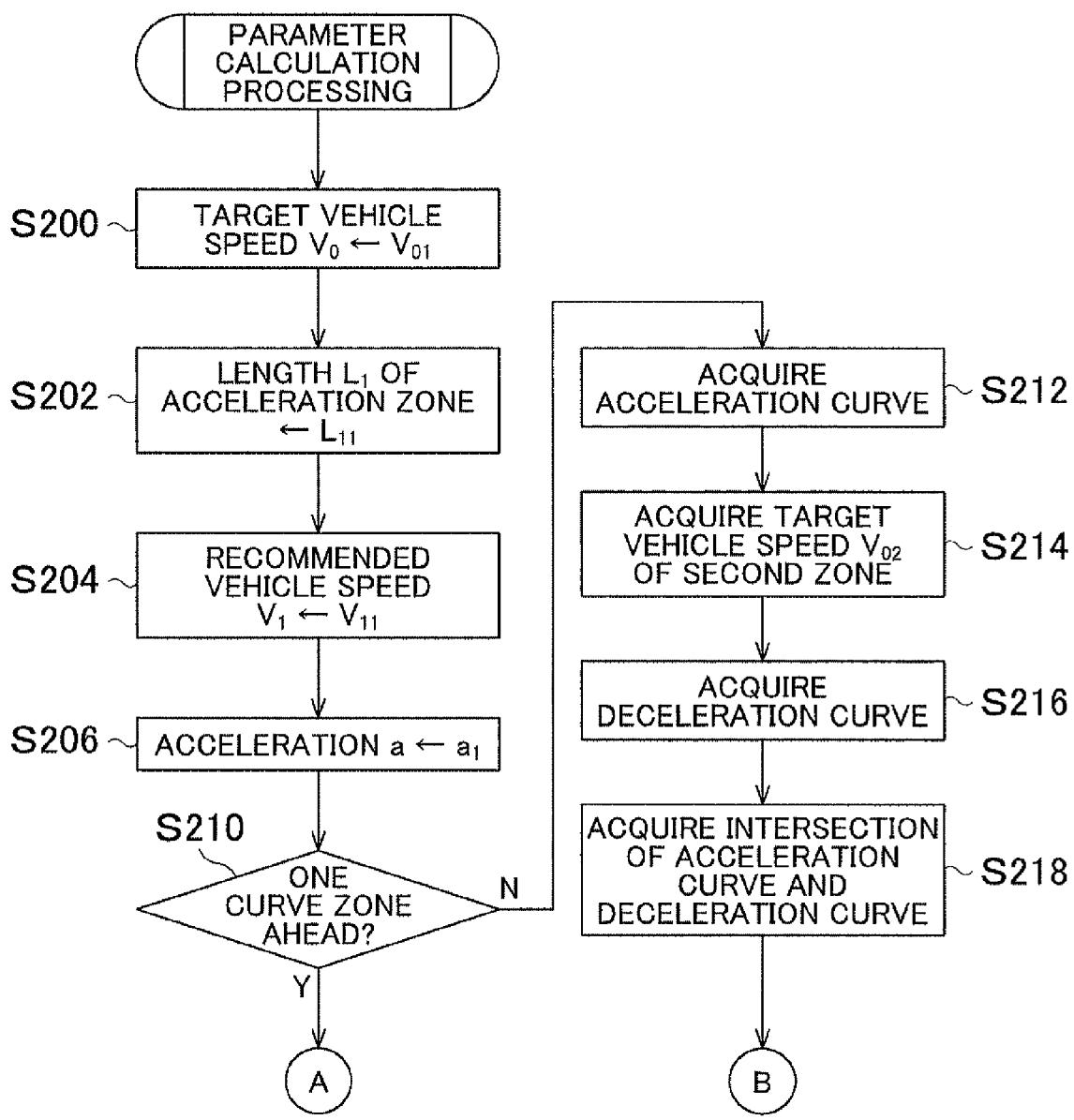
FIGS. 4A and 4B are flowcharts of the parameter calculation process.
Figure 4B:
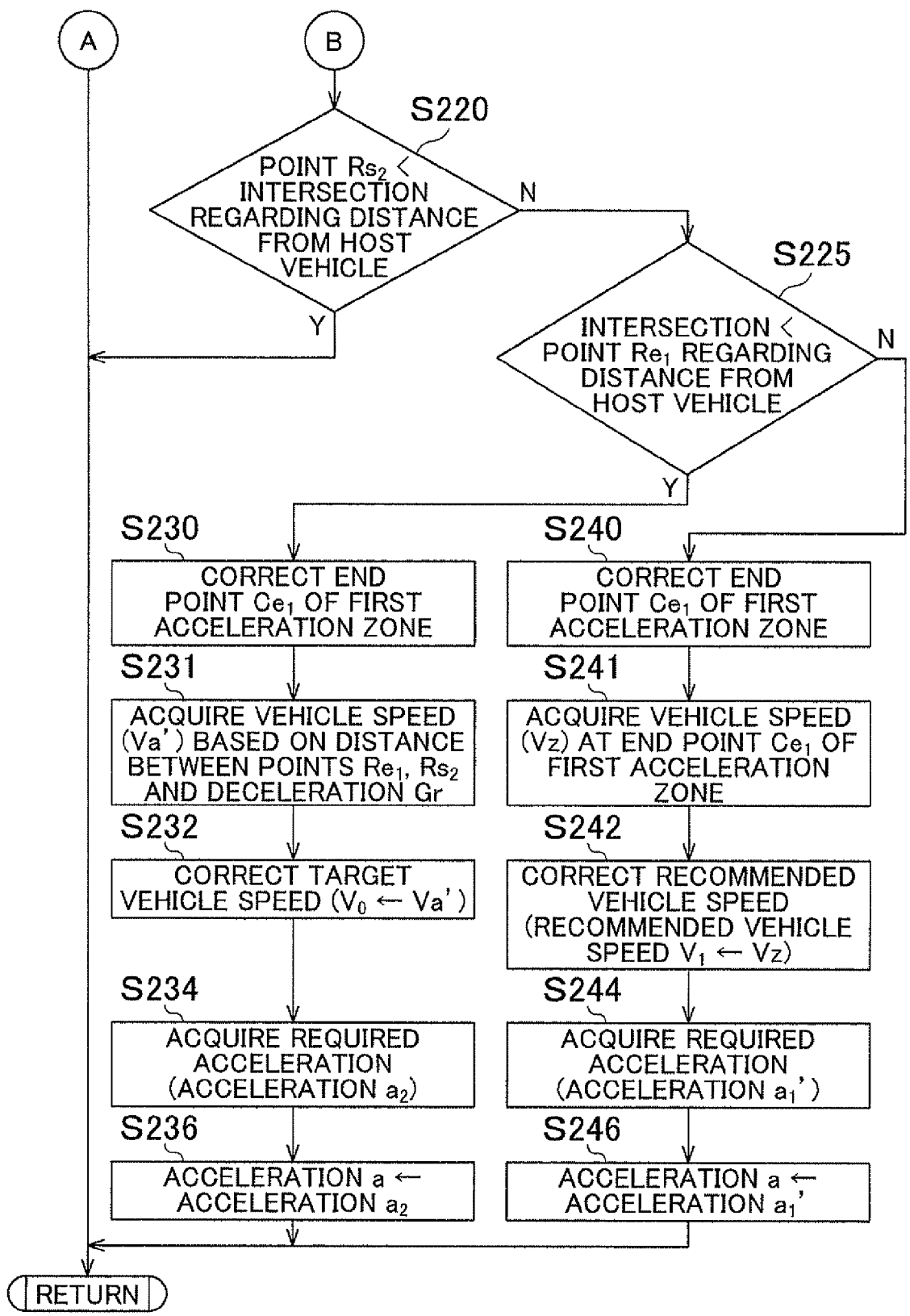

FIGS. 4A and 4B are flowcharts that show the parameter calculation process at S120. In the parameter calculation process shown in FIGS. 4A and 4B, first, the control unit 20 acquires the first target vehicle speed $V_{01}$ of the curve zone closest to the host vehicle C (i.e., the first zone), the length $L_{11}$ of the first acceleration zone $Za_1$, the first recommended vehicle speed $V_{11}$, and the first required acceleration (an acceleration $a_1$). These are respectively assigned as the target vehicle speed $V_0$, the length $L_1$ of the acceleration zone Za, the recommended vehicle speed $V_1$, and the acceleration a (S200, S202, S204, S206).

Namely, the control unit 20 refers to the curve zone information 30a1 to acquire the radius R and the preset lateral acceleration Gt for the first zone $Zr_1$, and calculates target vehicle $V_{01}=(Gt \cdot R)^{1/2}$. Next, the control unit 20 acquires the length $L_{11}$ linked to the radius R by following predetermined rules, and refers to the map information 30a to acquire the recommended vehicle speed $V_1$. The control unit 20 further calculates $a_1=(V_{11}^2-V_{01}^2)/(2L_{11})$. Note that the parameters set at S200 to S206 are suitably corrected as necessary in a subsequent process.

Next, the control unit 20 refers to the map information 30a and determines whether there is only one curve zone ahead of the host vehicle C (S210). Here, various configurations may be adopted provided that it is possible to determine whether the second deceleration zone $Zd_2$ and the first acceleration zone $Za_1$ may overlap. For example, a configuration may be used wherein it is determined whether the start point $Ca_2$ of the second deceleration zone $Zd_2$ is closer to the host vehicle C than the end point $Ce_1$ of the first acceleration zone $Za_1$. If it is determined at S210 that there is only one curve zone ahead of the host vehicle C, the control unit 20 skips the process at S212 onward and returns to the process shown in FIG. 3 with the parameters acquired at S200 to S206 as the established values.

If it is determined at S210 that there is not only one curve zone ahead of the host vehicle C, the control unit 20 acquires an acceleration curve that shows a change in vehicle speed when accelerating the host vehicle C in the first acceleration zone $Za_1$ (S212). Here, the acceleration curve is a curve that indicates for each point the vehicle speed when traveling the first zone $Zr_1$ (the first target vehicle speed $V_{01}$), the vehicle speed when accelerating at the first required acceleration in the first acceleration zone $Za_1$, and the vehicle speed after traveling the first acceleration zone $Za_1$ (the first recommended vehicle speed $V_{11}$ prior to correction). Regarding the vehicle speed of the first acceleration zone $Za_1$, the acceleration curve indicates for each point the vehicle speed when traveling in a uniform accelerated motion from the first target vehicle speed $V_{01}$ at the acceleration $a_1$. Next, the control unit 20 acquires the second target vehicle speed $V_{02}$ of the second zone $Zr_2$ (S214). Namely, the control unit 20 refers to the curve zone information 30a1 to acquire the radius R and the preset lateral acceleration Gt for the second zone $Zr_2$, and calculates target vehicle $V_{02}=(Gt \cdot R)^{1/2}$. The control unit 20 subsequently acquires a deceleration curve that shows a change in vehicle speed when decelerating the host vehicle C in the second deceleration zone $Zd_2$ (S216).

Figure 5A:
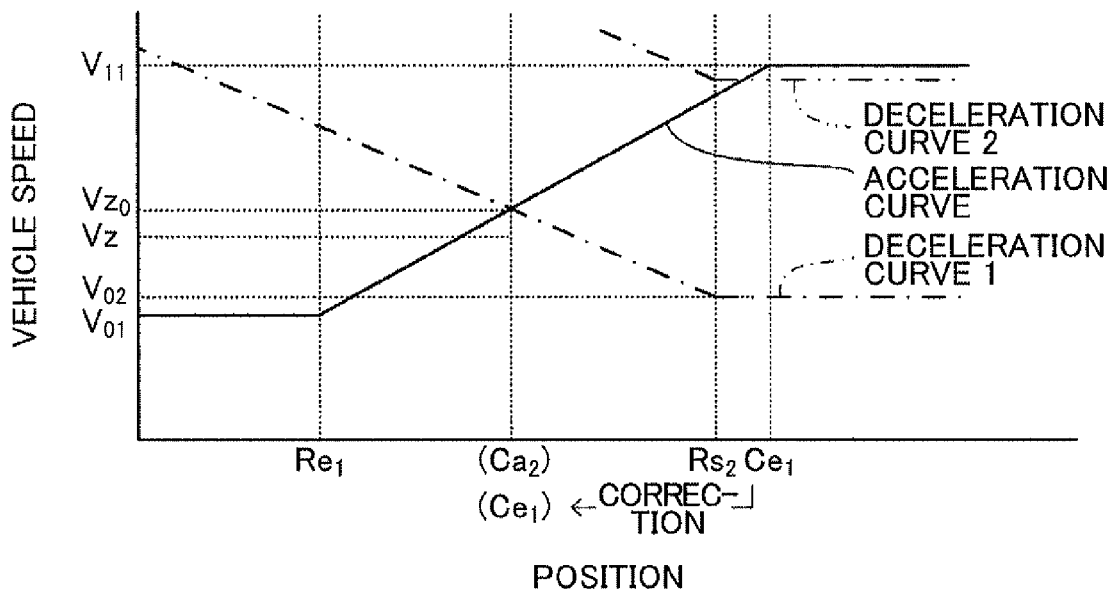
FIGS. 5A and 5B are schematic diagrams that show acceleration curves and deceleration curves.

Here, the deceleration curve is a curve that indicates for each point the vehicle speed when slowing at a predetermined deceleration in the second deceleration zone $Zd_2$ to travel at the second target vehicle speed $V_{02}$ in the second zone $Zr_2$, and the vehicle speed when traveling the second zone $Zr_2$ (the second vehicle speed $V_{02}$). Regarding the vehicle speed prior to the second zone $Zr_2$, the deceleration curve indicates for each point the vehicle speed when traveling in a uniform decelerated motion toward the start point $Rs_2$ of the first zone $Zr_2$ and transitioning to the second target vehicle speed $V_{02}$ at the start point $Rs_2$. FIG. 5 schematically shows the above acceleration and deceleration curves by solid and dashed lines, respectively, with the horizontal axis indicating position and the vertical axis indicating vehicle speed. FIG. 5 also schematically shows the vehicle speed defined in relation to position, and the precise shape of the curve may be a different shape.

Next, the control unit 20 acquires an intersection point of the acceleration curve and the deceleration curve (S218). In other words, the control unit 20 identifies a point of coincidence where the vehicle speed at the time of acceleration and the vehicle speed at the time of deceleration coincide. The control unit 20 subsequently refers to the map information 30a and determines whether the start point $Rs_2$ of the second zone $Zr_2$ is closer than the intersection point acquired at S218 to the host vehicle C (S220). If it is determined at S220 that the start point $Rs_2$ of the second zone $Zr_2$ is closer than the above intersection point to the host vehicle C, the control unit 20 returns to the process shown in FIG. 3. Namely, in such case, similar to a deceleration curve 2 shown by a dashed-two-dotted line in FIG. 5A, in the course of acceleration using the first acceleration gear ratio, the host vehicle reaches the start point $Rs_2$ of the second zone $Zr_2$ without decelerating, and the vehicle speed at the start point $Rs_2$ can be set to the second target vehicle speed $V_{02}$ in the second zone $Zr_2$. Therefore, the control unit 20 does not correct the first recommended vehicle speed $V_1$ in the first acceleration zone $Za_1$ and ends the process shown in FIG. 4B.

If it is determined at S220 that the start point $Rs_2$ of the second zone $Zr_2$ is not closer than the above intersection point to the host vehicle C, the control unit 20 refers to the map information 30a again and determines whether the intersection point is closer than the end point $Re_1$ of the first zone $Zr_1$ to the host vehicle C (S225). If it is determined at S225 that the intersection point is not closer than the end point $Re_1$ of the first zone $Zr_1$ to the host vehicle C, then with the addition of the conditions of S210 and S220 the relationship between the acceleration curve and the deceleration curve may correspond to the relationship between the acceleration curve and a deceleration curve 1 shown in FIG. 5A, for example. Accordingly, the distance from the host vehicle C in order from closest first is the end point $Re_1$ of the first zone $Zr_1$, the intersection point, and the end point $Ce_1$ of the first deceleration zone $Zd_1$.

Under circumstances where the points have such a positional relationship, according to the present embodiment, the recommended vehicle speed and the required acceleration are corrected because while the host vehicle is traveling using the first acceleration gear ratio a control is performed for changing to the second acceleration gear ratio. To this end, first, the end point $Ce_1$ of the first acceleration zone $Za_1$ is corrected to the intersection point (S240). When this correction is made, the start point $Ca_2$ of the second deceleration zone $Zd_2$ is also corrected. In other words, the corrected end point $Ce_1$ of the first acceleration zone $Za_1$ and the corrected start point $Ca_2$ of the second deceleration zone $Zd_2$ are coincided. Note that on the horizontal axes of FIG. 5, the end point of the first acceleration zone $Za_1$ and the start point of the second deceleration zone $Zd_2$ set according to the above corrections are indicated as ($Ce_1$) and ($Ca_2$), respectively. FIG. 6A is a figure that illustrates an example of a road that meets the conditions, wherein post-correction parameters are shown in parentheses and pre-correction parameters are shown without parentheses. In FIG. 6A, the pre-correction first acceleration zone $Za_1$ and the pre-correction second deceleration zone $Zd_2$ are indicated by a thin dashed-two-dotted line and a dashed line, respectively. The post-correction first acceleration zone $Za_1$ and the post-correction second deceleration zone $Zd_2$ are shown by a bold dashed-two-dotted line and a dashed curve, respectively.

Next, the control unit 20 acquires a vehicle speed Vz at the end point $Ce_1$ of the post-correction first acceleration zone $Za_1$ (S241). Namely, the control unit 20 acquires a vehicle speed ($Vz_0$ in FIG. 5A) at the intersection point of the acceleration curve and the deceleration curve. The control unit 20 then multiplies the vehicle speed by the above predetermined coefficient, and sets the product thereof as the vehicle speed Vz.

The control unit 20 subsequently corrects the recommended vehicle speed $V_1$ to the vehicle speed Vz (S242). Next, the control unit 20 acquires a required acceleration (acceleration $a_1'$) for traveling the post-correction first acceleration zone $Za_1$ after traveling the first zone $Zr_1$ and accelerating the host vehicle to the vehicle speed Vz (S244), and corrects the acceleration a to the acceleration $a_1'$ (S246). Specifically, $a_1'=(V_1^2-V_{01}^2)/(2L_{11})$, where $L_{11}$ is the length of the post-correction first acceleration zone $Za_1$. The acceleration a is corrected using the obtained acceleration $a_1'$. With this processing, the pre-correction first required acceleration is corrected using the required acceleration for traveling the post-correction first acceleration zone $Za_1$ after traveling the first zone $Zr_1$ and accelerating the host vehicle to the vehicle speed Vz. An acceleration for smoothly increasing speed in the post-correction first acceleration zone $Za_1$ is thus set as the acceleration a. After the process is complete, the control unit 20 returns to the process shown in FIG. 3.

Figure 5B:
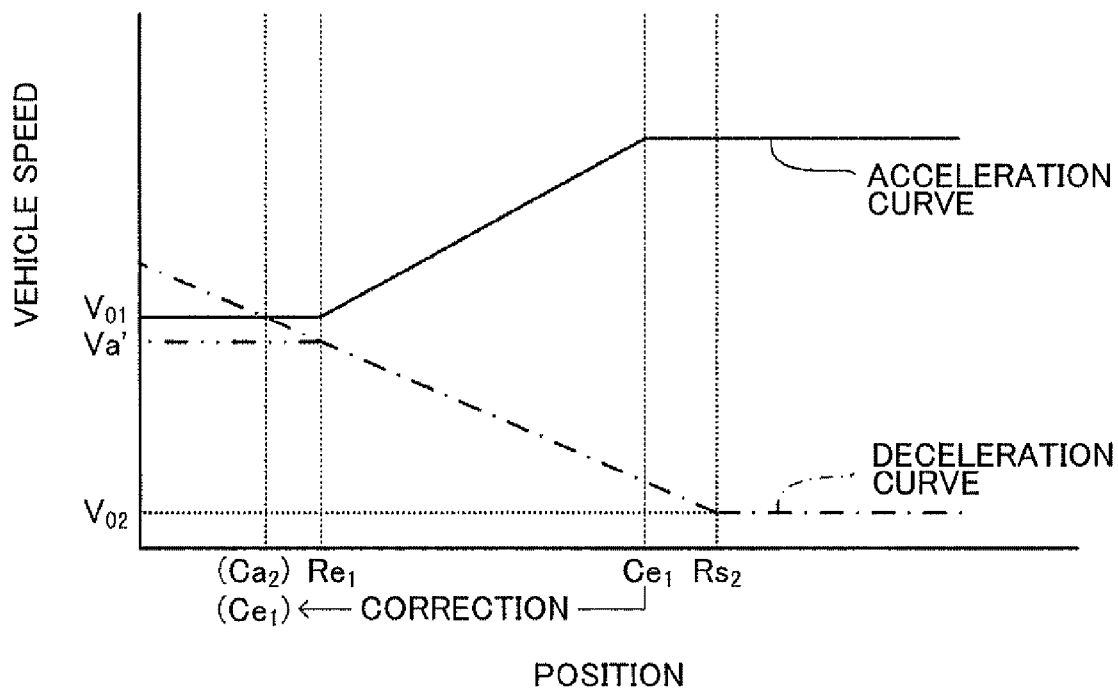
Figure 6A:
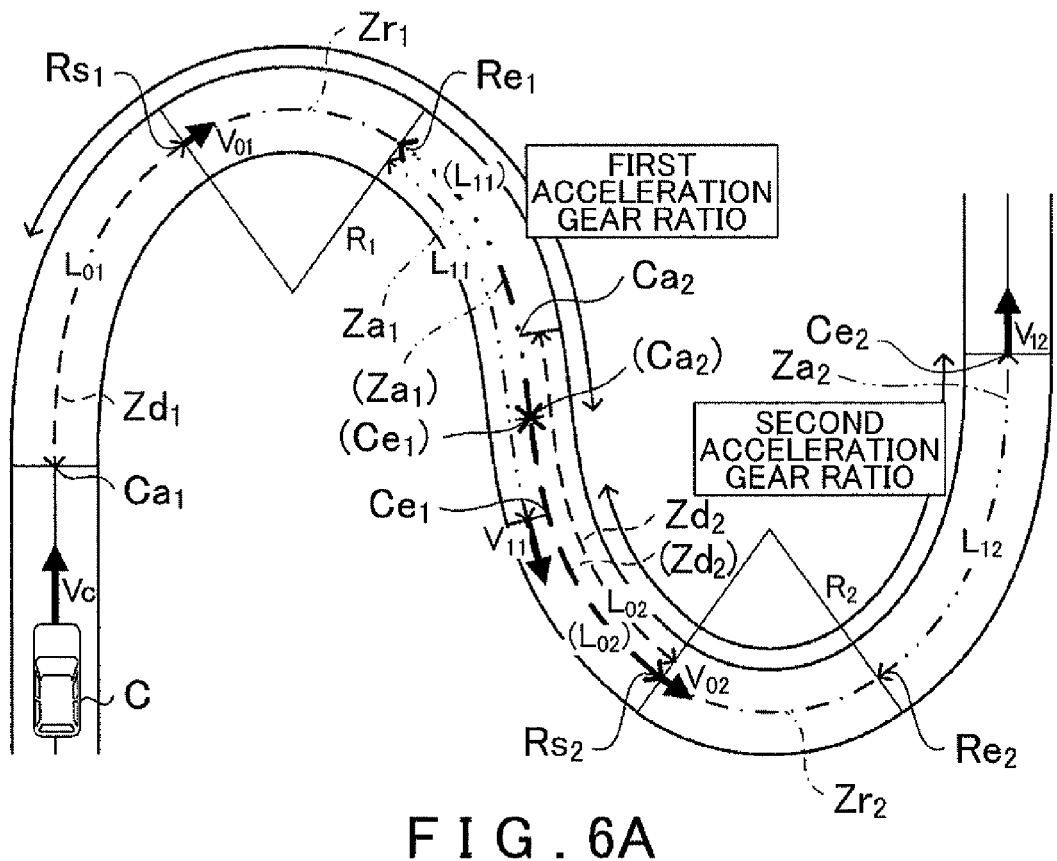
FIGS. 6A and 6B are figures that show examples of a curve zone.
Figure 6B:
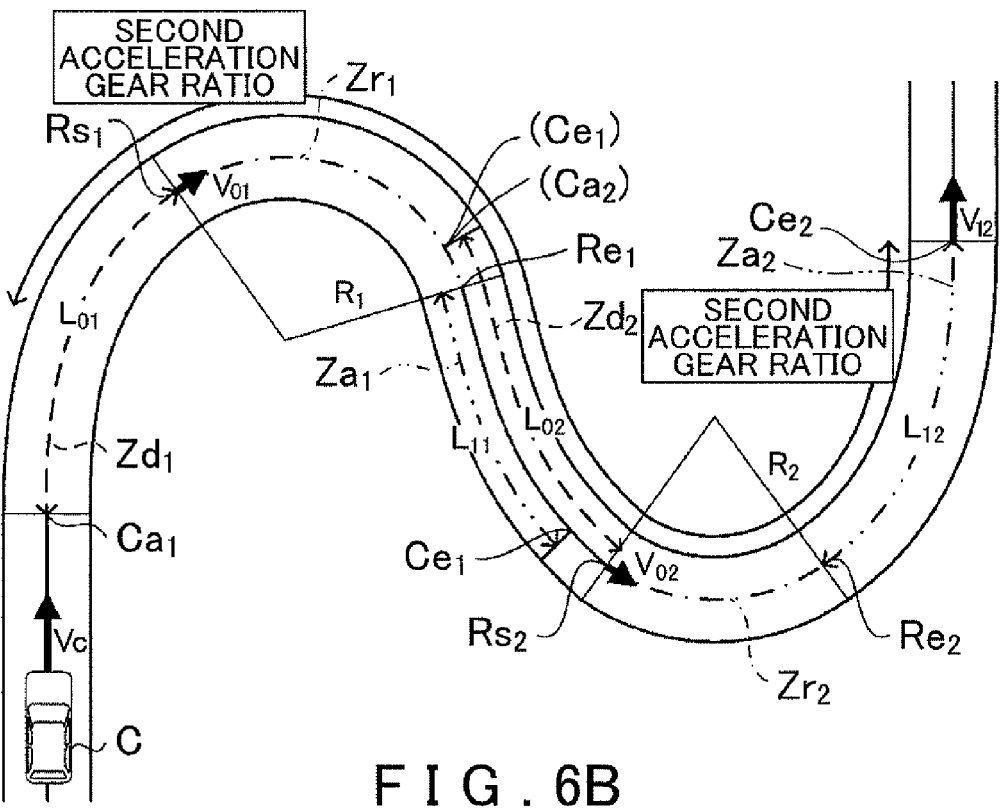

However, if it is determined at S225 that the intersection point is closer than the end point $Re_1$ of the first zone $Zr_1$ to the host vehicle C, then with the addition of the conditions of S210 and S220 the relationship between the acceleration curve and the deceleration curve may correspond to the relationship between the acceleration curve and the deceleration curve shown in FIG. 5B, for example. Accordingly, the distance from the host vehicle C in order from closest first is the intersection point, the end point $Re_1$ of the first zone $Zr_1$, and the end point $Ce_1$ of the first acceleration zone $Za_1$. FIG. 6B is a figure that illustrates an example of a road that meets the conditions, wherein post-correction parameters are shown in parentheses and pre-correction parameters are shown without parentheses.

Under circumstances where the points have such a positional relationship, a control for deceleration must be initiated without accelerating after traveling the first zone $Zr_1$. Hence, according to the present embodiment, a process is executed for setting the gear ratio to the second acceleration gear ratio rather than the first acceleration gear ratio in the first deceleration zone $Zd_1$, so that smooth acceleration can be achieved after traveling the first zone $Zr_1$ and the second zone $Zr_2$.

In this process, the control unit 20 corrects the end point $Ce_1$ of the first acceleration zone $Za_1$ to the intersection point (S230). In this case as well, similar to S240, the start point $Ca_2$ of the second deceleration zone $Zd_2$ is also corrected, and the corrected start point $Ca_2$ and the end point $Ce_1$ of the first acceleration zone $Za_1$ are coincided. Next, the control unit 20 acquires a vehicle speed Va' for the first zone $Zr_1$, whereby the target vehicle speed $V_0$ at the start point $Rs_2$ of the second zone $Zr_2$ can be decelerated to the second target vehicle speed $V_{02}$ in the second zone $Zr_2$ (S231). Namely, the control unit 20 calculates $Va'=(2Le \cdot Ge+V_{02}^2)^{1/2}$. Here, Le refers to a length from the end point $Re_1$ of the first zone $Zr_1$ to the start point $Rs_2$ of the second zone $Zr_2$, and Ge refers to the predetermined deceleration (e.g. 0.2 G). The target vehicle speed $V_0$ is then corrected to Va' (S232). Namely, in order to travel in the second zone $Zr_2$ at the target vehicle speed $V_{02}$ of the second zone $Zr_2$, the target vehicle speed of the first zone $Zr_1$ is corrected in line with the second zone $Zr_2$.

Next, the control unit 20 acquires a required acceleration (acceleration $a_2$) for traveling the second acceleration zone $Za_2$ after traveling the second zone $Zr_2$ and accelerating the host vehicle to the target vehicle speed $V_{02}$ (S234), and corrects the acceleration a to the acceleration $a_2$ (S236). Specifically, $a_2=(V_{12}^2-V_{02}^2)/(2L_{12})$. The acceleration a is corrected using the obtained acceleration $a_2$ (S236). With this process, an acceleration for smoothly increasing speed in the second acceleration zone $Za_2$ is thus set as the acceleration a. After the process is complete, the control unit 20 returns to the process shown in FIG. 3.

(2-2) Vehicle Deceleration Processing

Figure 7:
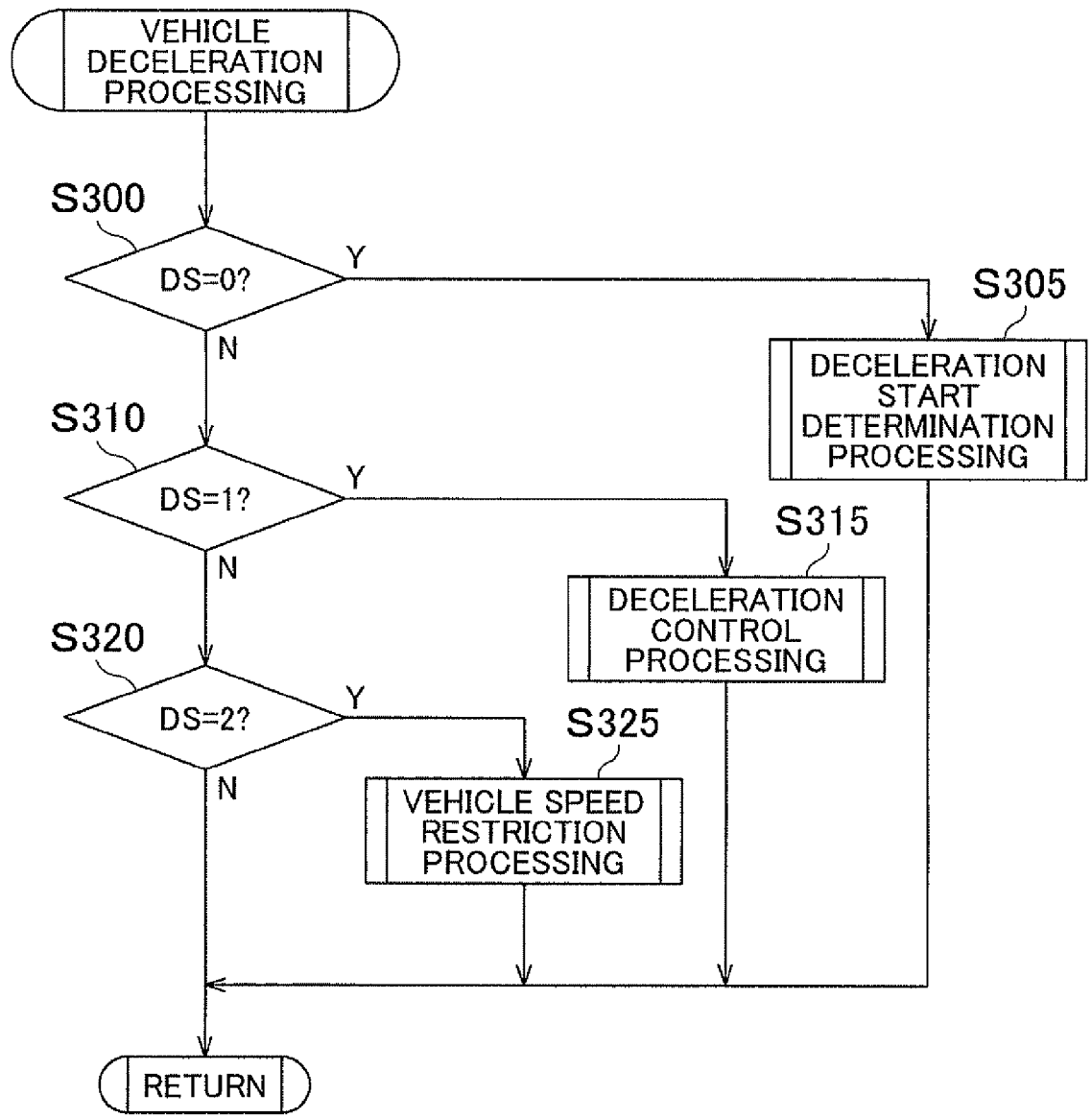
FIG. 7 is a flowchart of the vehicle deceleration process.

FIG. 7 is a flowchart that shows the vehicle deceleration process at S130. According to the vehicle deceleration process shown in FIG. 7, the control unit 20 determines whether the deceleration control status DS equals 0 (S300), 1 (S310), or 2 (S320). When it is determined at S300 that DS=0, the control unit 20 executes the deceleration start determination process (S305); when it is determined at S310 that DS=1, the control unit 20 executes the deceleration control process (S315); and when it is determined at S320 that DS=2, the control unit 20 executes the vehicle speed restriction process (S325). In the case of another determination result and after executing S305, S315, and S325, the control unit 20 returns to and repeats the process of FIG. 3.

(2-3) Deceleration Start Determination Processing

Figure 8:
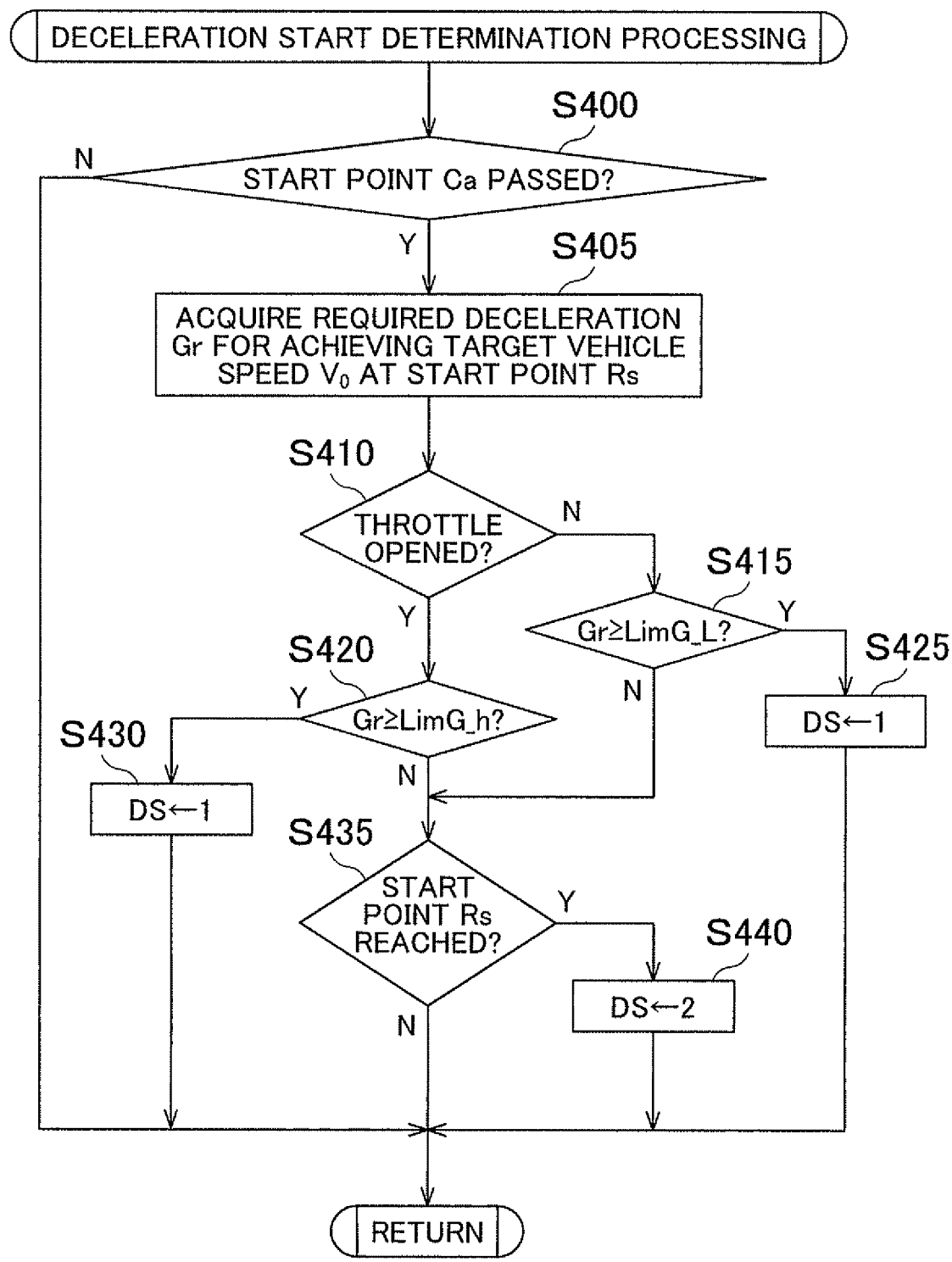
FIG. 8 is a flowchart of the deceleration start determination process.

FIG. 8 is a flowchart that shows the deceleration start determination process at S305. According to the deceleration start determination process, processing is performed for setting the deceleration control status DS to 1 or 2 based on preset conditions. To this end, first, the control unit 20 uses the processing of the deceleration control unit 21*e* to determine whether the host vehicle has passed the start point Ca of the closest deceleration zone Zd ahead of the host vehicle in the traveling direction of the host vehicle (S400). If it is determined at S400 that the host vehicle has not passed the start point Ca of the closest deceleration zone Zd ahead of the host vehicle in the traveling direction of the host vehicle, then the control unit 20 skips the process at S405 onward and returns to the process shown in FIG. 7.

If it is determined at S400 that the host vehicle has passed the start point Ca of the closest deceleration zone Zd ahead of the host vehicle in the traveling direction of the host vehicle, then the control unit 20 uses the processing of the vehicle speed information obtaining unit 21*a* and the deceleration control unit 21*e* to acquire the required deceleration Gr for setting the vehicle speed of the host vehicle to the target vehicle speed $V_0$ at the start point Rs of the curve zone Zr (S405). Specifically, the control unit 20 calculates the required deceleration as $Gr=(V_0^2-Vc^2)/(2Lc)$ based on the radius R of the curve zone Zr, the target vehicle speed $V_0$, and the length Lc between the current position of the host vehicle and the end point Rs.

Next, the control unit 20 determines whether the throttle valve is open (the accelerator is depressed) (S410). Namely, the control unit 20 uses the processing of the deceleration control unit 21e to acquire the current throttle opening Th to determine whether the throttle valve is in an open state, i.e., not closed. If it is determined at S410 that the throttle valve is not open (the accelerator is not depressed), then the control unit 20 uses the processing of the deceleration control unit 21e to determine whether the required deceleration Gr is equal to or greater than the threshold LimG_L (S415). If it is determined at S410 that the throttle valve is open (the accelerator is depressed), then the control unit 20 uses the processing of the deceleration control unit 21e to determine whether the required deceleration Gr is equal to or greater than the threshold LimG_h (S420).

If it is determined at S415 and S420 that the required deceleration Gr is equal to or greater than the respective thresholds, then the control unit 20 uses the processing of the deceleration control unit 21e to set the deceleration control status DS to 1 (S425, S430). Namely, when the host vehicle approaches the curve zone Zr without decelerating, the required deceleration Gr for setting the vehicle speed to the target vehicle speed $V_0$ becomes larger as the host vehicle approaches the curve zone Zr. Since the required deceleration Gr exceeds a threshold at any timing, the deceleration control status DS is set to 1 to ensure that the deceleration control is executed after a threshold is exceeded. Note that in the present embodiment, the timing at which deceleration is initiated differs depending on the state of the throttle valve. The thresholds LimG_h and LimG_L are different values that correspond to when the throttle valve is open and closed, respectively, and LimG_h is set greater than LimG_L.

However, if it is determined at S415 and S420 that the required deceleration Gr is not equal to or greater than the respective thresholds, then the control unit 20 uses the processing of the deceleration control unit 21e to determine whether the host vehicle has reached the start point Rs of the curve zone Zr (S435). Namely, the control unit 20 acquires the current position of the host vehicle based on the output signals from the GPS receiving portion 41 and the like, then refers to the curve zone information 30a1 to acquire the position of the start point Rs of the curve zone Zr and determine whether the current position of the host vehicle has passed the position of the start point Rs of the curve zone Zr. If it is determined at S435 that the host vehicle has reached the start point Rs of the curve zone Zr, then the control unit 20 sets the deceleration control status DS to 2. Namely, the control unit 20 sets the deceleration control status DS to 2 when the host vehicle reaches the curve zone Zr without the required deceleration Gr exceeding a threshold. If it is determined at S435 that the host vehicle has not reached the end point Rs of the deceleration zone Zd, then the control unit 20 returns to the process shown in FIG. 7.

(2-4) Deceleration Control Processing

Figure 9:
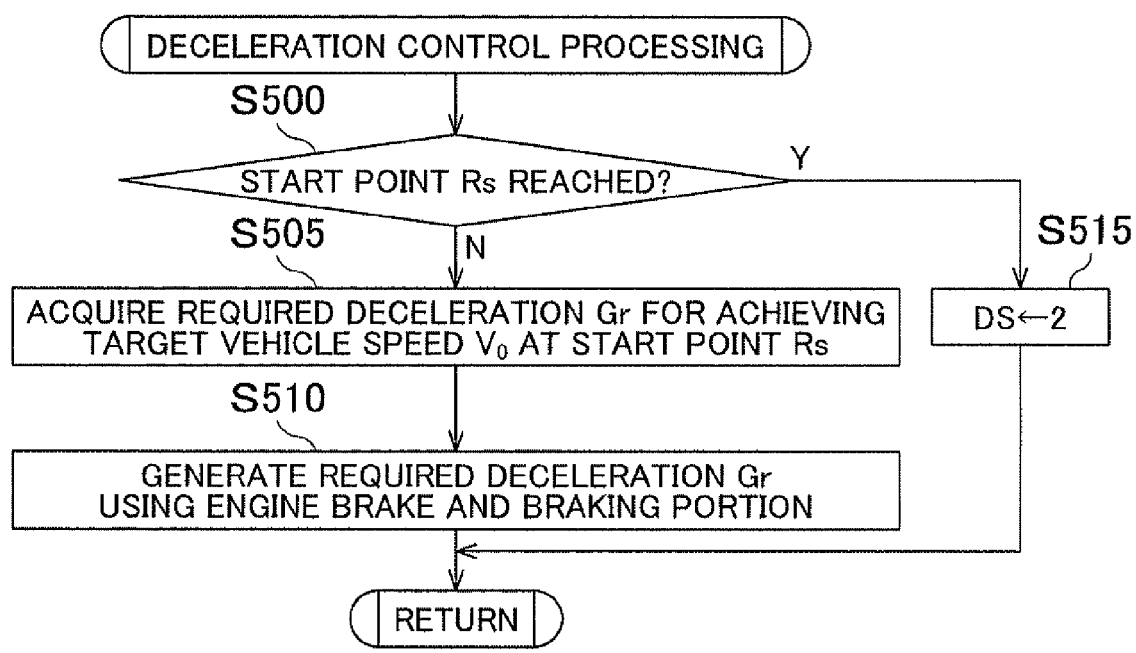
FIG. 9 is a flowchart of the deceleration control process.

FIG. 9 is a flowchart that shows the deceleration control process at S315. According to the deceleration control process, processing is performed for decelerating the host vehicle to achieve the target vehicle speed $V_0$. To this end, first, the control unit 20 uses the processing of the deceleration control unit 21e to determine whether the host vehicle has reached the start point Rs of the curve zone Zr (the end point of the deceleration zone Zd) (S500). Namely, the control unit 20 acquires the current position of the host vehicle based on the output signals from the GPS receiving portion 41 and the like, then refers to the curve zone information 30a1 to acquire the position of the start point Rs of the curve zone Zr and determine whether the current position of the host vehicle has passed the position of the start point Rs of the curve zone Zr.

If it is determined at S500 that the host vehicle has not reached the start point Rs of the curve zone Zr, then the control unit 20 uses the processing of the vehicle speed information obtaining unit 21a and the deceleration control unit 21e to acquire the required deceleration Gr for setting the vehicle speed of the host vehicle to the target vehicle speed $V_0$ at the start point Rs of the curve zone Zr (S505). Such processing is identical to that at S405.

The control unit 20 next generates the required deceleration Gr using the engine brake and the braking portion 45 (S510). Namely, through the process executed by the deceleration control unit 21e, the control unit 20 acquires the current gear ratio Sn and the current throttle opening Th to acquire a deceleration Ge to be generated by the engine brake on the basis of the engine rotational speed at the gear ratio Sn and the throttle opening Th. The control unit 20 then outputs a control signal to the braking portion 45 for generating a deceleration equivalent to (Gr−Ge) using the brake.

Thus, the brake is operated by the braking portion 45 to compensate for the difference between the required deceleration Gr and the deceleration Ge (Gr−Ge), and the deceleration of the host vehicle becomes the required deceleration Gr. Since, as described above, the required deceleration Gr is a required deceleration for transitioning the current vehicle speed Vc of the host vehicle to the target vehicle speed $V_0$ within the length Lc, repeating the above control converges the vehicle speed of the host vehicle on the target vehicle speed $V_0$. Note that the gear ratio in the deceleration control above is determined based on the required acceleration a, not the required deceleration Gr. And the gear ratio of the host vehicle can be changed to the acceleration gear ratio Sa at any point within the deceleration zone Zd using a process that will be described later.

If it is determined at S500 that the host vehicle has reached the start point Rs of the curve zone Zr, then the control unit 20 sets the deceleration control status DS to 2 (S515). Namely, when the host vehicle reaches the curve zone Zr, the deceleration control status DS is set to 2 to ensure that the process to maintain the vehicle speed and not decelerate is carried out. Note that after S510 and S515, the control unit 20 returns to the process shown in FIG. 7.

(2-5) Vehicle Speed Restriction Processing

Figure 10:
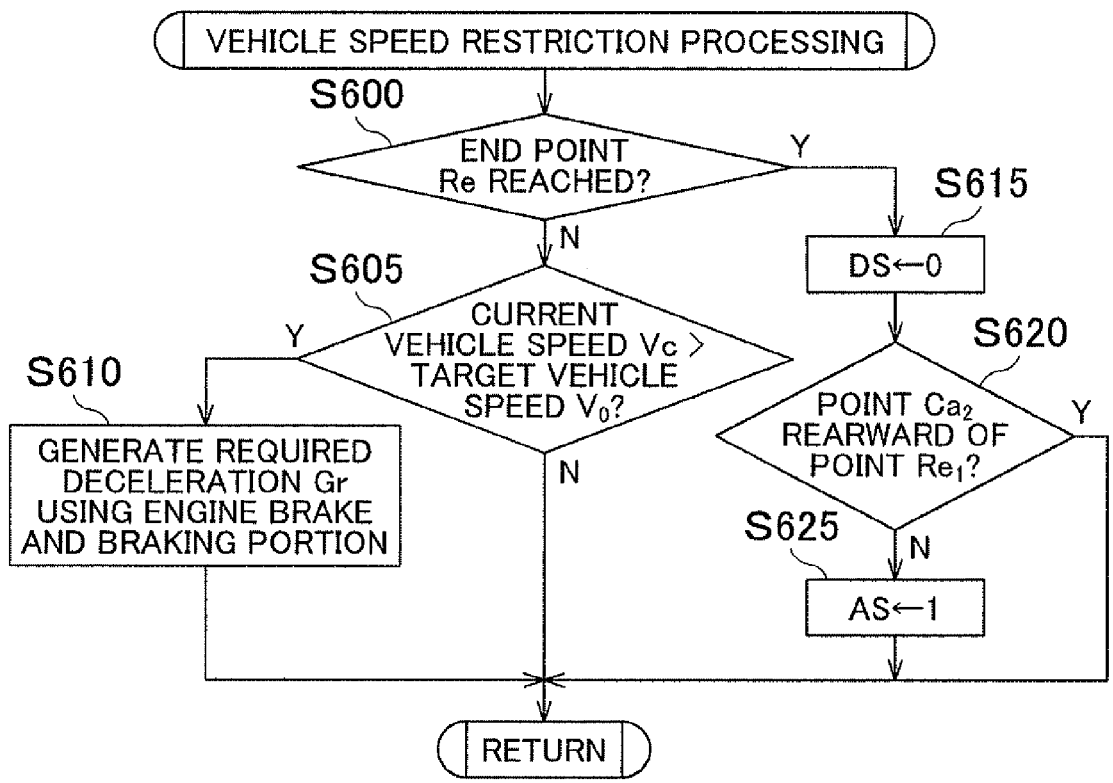
FIG. 10 is a flowchart of the vehicle speed restriction process.

FIG. 10 is a flowchart that shows the vehicle speed restriction process at S325. According to the vehicle speed restriction process, processing is performed for maintaining the vehicle speed of the host vehicle at the target vehicle speed $V_0$. To this end, first, the control unit 20 uses the processing of the deceleration control unit 21e to determine whether the host vehicle has reached the end point Re of the curve zone Zr (the start point of the acceleration zone Za) (S600). Namely, the control unit 20 acquires the current position of the host vehicle based on the output signals from the GPS receiving portion 41 and the like, then refers to the curve zone information 30a1 to acquire the position of the end point Re of the curve zone Zr and determine whether the position of the end point Re is rearward of the current position of the host vehicle in the traveling direction of the host vehicle.

If it is determined at S600 that the host vehicle has not reached the end point Re of the curve zone Zr, then the control unit 20 uses the processing of the deceleration control unit 21e to specify the current vehicle speed Vc based on the output information of the vehicle speed sensor 42, and determine whether the current vehicle speed Vc exceeds the target vehicle speed $V_0$ (S605). If it is determined at S605 that the current vehicle speed Vc exceeds the target vehicle speed $V_0$, then the control unit 20 generates the required deceleration Gr using the engine brake and the braking portion 44 (S610). The process at S610 is identical to that at S510 described above.

However, if it is determined at S600 that the host vehicle has reached the end point Re of the curve zone Zr, then in order to end the deceleration control and start the acceleration control, the control unit 20 sets the deceleration control status DS to 0 (S615). In addition, the control unit 20 determines whether the start point $Ca_2$ of the second deceleration zone $Zd_2$ is rearward of the end point $Re_1$ of the first zone $Zr_1$ in the traveling direction of the host vehicle (S620). If it is determined that the start point $Ca_2$ is not rearward of the end point $Re_1$ in the traveling direction of the host vehicle, the control unit 20 sets the acceleration control status AS to 1 (S625); if it is determined that the start point $Ca_2$ is rearward of the end point $Re_1$ in the traveling direction of the host vehicle, the control unit 20 skips the process at S625. If it is determined subsequent to S610 and S625, or at S605, that the current vehicle speed Vc does not exceed the target vehicle speed $V_0$, then the control unit 20 returns to the process shown in FIG. 7.

(2-6) Gear Ratio Selection Processing

Figure 11:
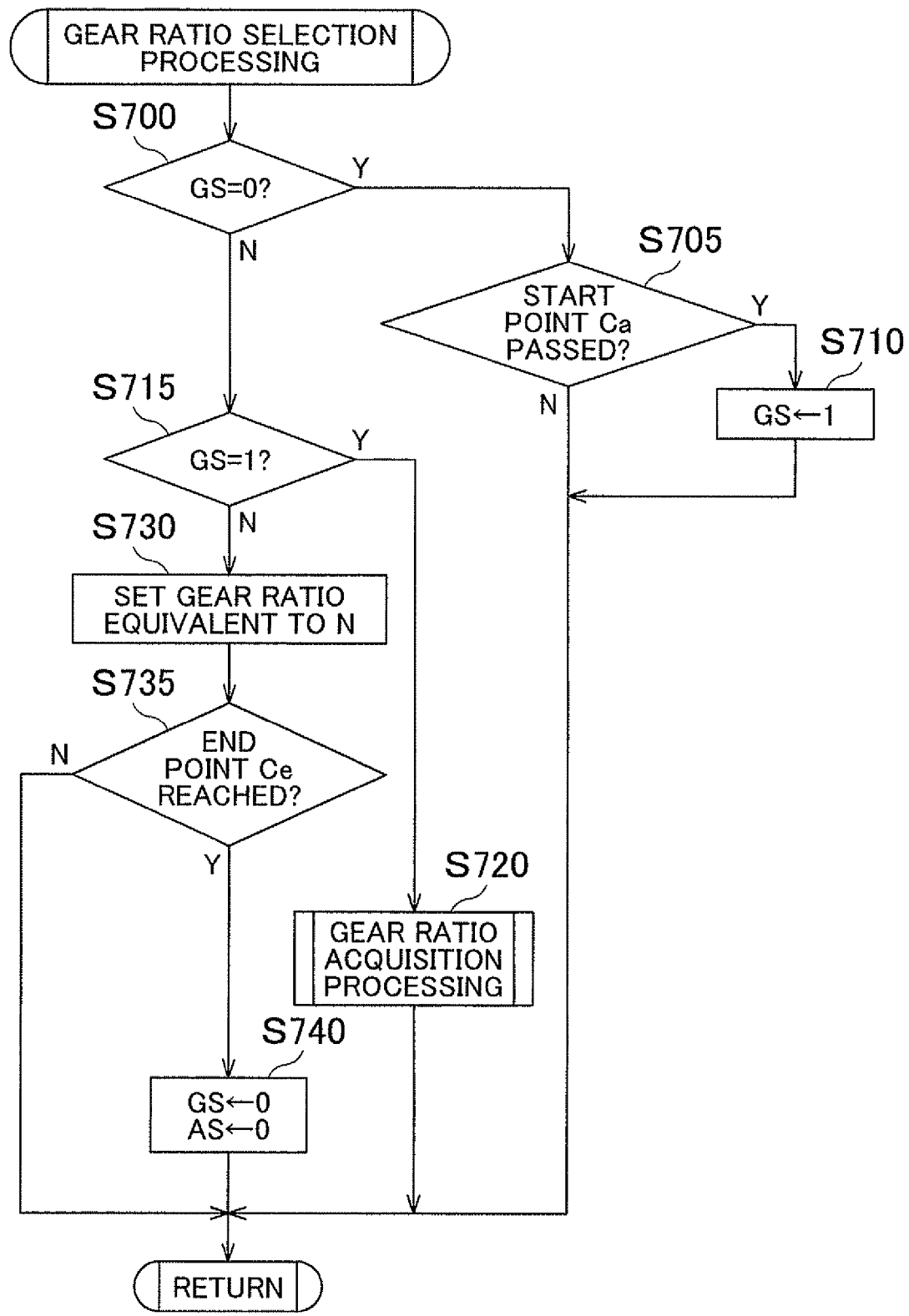
FIG. 11 is a flowchart of the gear ratio selection process.

FIG. 11 is a flowchart that shows the gear ratio selection process at S140. According to the gear ratio selection process, processing is executed for specifying the gear ratio control status GS, acquiring the acceleration gear ratio Sa, and setting the gear ratio. In the gear ratio selection process, the control unit 20 determines whether the gear ratio control status GS equals 0 (S700), or 1 (S715). If it is determined at S700 that GS=0, the control unit 20 executes the process for setting the gear ratio control status GS to 1 (S705, S710); if it is determined at S715 that GS=1, the control unit 20 executes the gear ratio acquisition process (S720).

Note that at S705, the control unit 20 uses the processing of the deceleration control unit 21e to determine whether the host vehicle has passed the start point Ca of the deceleration zone Zd. Namely, the control unit 20 determines whether the current position of the host vehicle is forward of the start point Ca of the deceleration zone Zd in the traveling direction of the host vehicle. If it is determined at S705 that the host vehicle has not passed the start point Ca of the deceleration zone Zd, then the control unit 20 skips the process at S710 and returns to the process shown in FIG. 3. However, if it is determined that the current position of the host vehicle has passed the start point Ca of the deceleration zone Zd, the control unit 20 sets the gear ratio control status GS to 1.

The gear ratio acquisition process at S720 will be described in detail later; however, according to the gear ratio acquisition process, processing is performed to substitute a value that indicates the gear speed corresponding to the acceleration gear ratio Sa for a variable N that indicates a gear speed corresponding to the gear ratio, and set the gear ratio control status GS to 2. In FIG. 11, if it is not determined that GS=0 at S700 and not determined that GS=1 at S715, i.e., when the gear ratio control status GS is 2, the control unit 20 uses the processing of the gear ratio control unit 21d to set the gear ratio such that the host vehicle travels at a gear ratio corresponding to the variable N (S730). Here, a value that indicates the gear speed corresponding to the acceleration gear ratio Sa is substituted for the variable N, and the control unit 20 outputs a control signal to the gear shift portion 44 to shift to the gear speed indicated by the variable N.

Next, the control unit 20 uses the processing of the gear ratio control unit 21d to determine whether to maintain the state of the gear ratio set to the acceleration gear ratio Sa. Namely, the control unit 20 determines whether the host vehicle has reached the end point Ce of the acceleration zone Za (S735). If it is determined at S735 that the host vehicle has reached the end point Ce, the control unit 20 sets the gear ratio control status GS to 0 and sets the acceleration control status AS to 0 (S740). However, if it is determined at S735 that the host vehicle has not reached the end point Ce, the control unit 20 skips the process at S740. Note that in the present embodiment, once the gear ratio control status GS becomes 0, the state in which the gear ratio is set to the acceleration gear ratio Sa is canceled, which enables gear shifting in accordance with a driver's operation. Moreover, the gear ratio acquisition process pertaining to a new curve zone is executed based on the determination at S705 and the distance to the start point Ca of the deceleration zone associated with the new curve zone being within a predetermined distance, with the gear ratio control status GS set to 0.

(2-7) Gear Ratio Acquisition Processing

Figure 12:
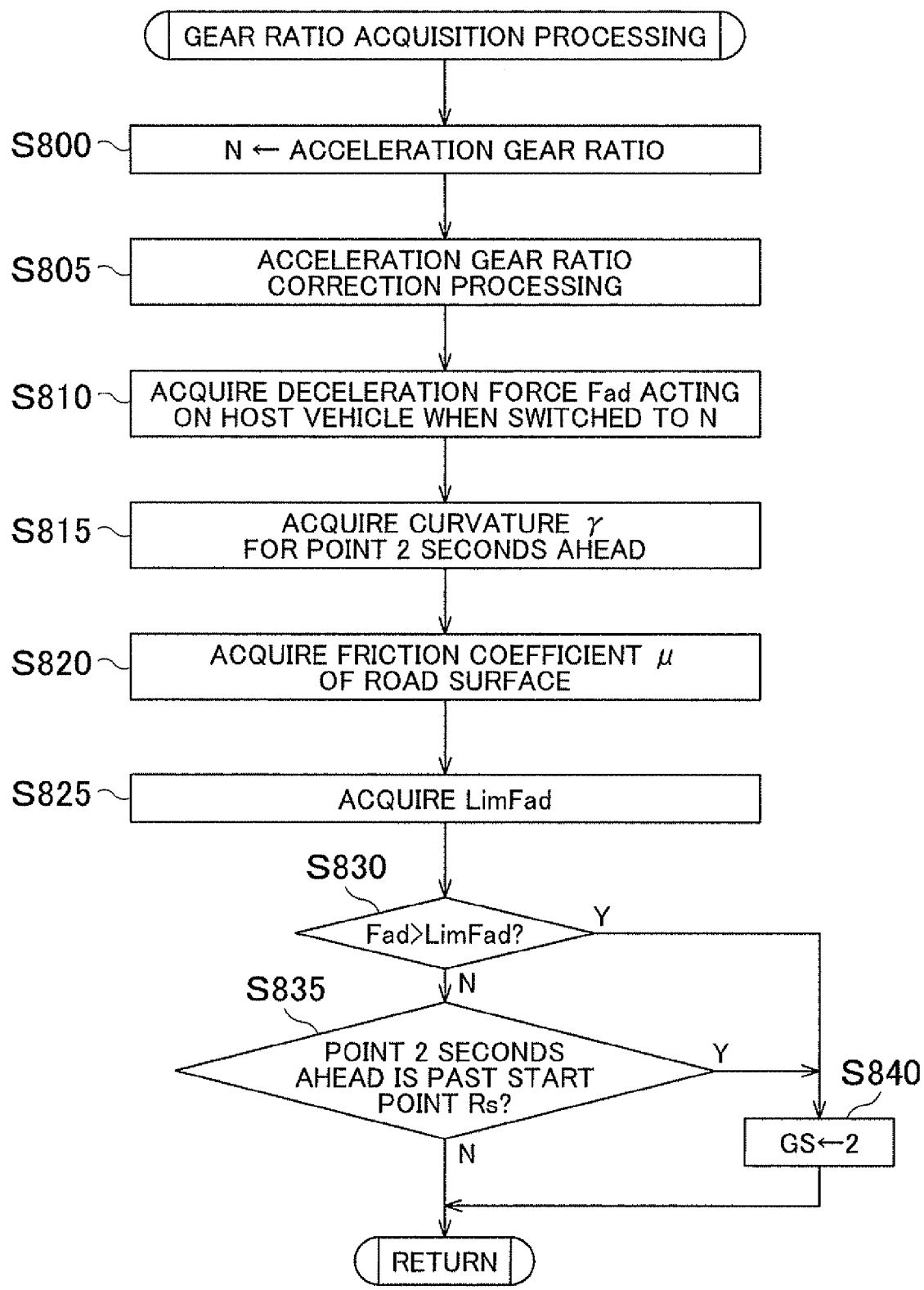
FIG. 12 is a flowchart of the gear ratio acquisition process.

FIG. 12 is a flowchart that shows the gear ratio acquisition process at S720. According to the gear ratio acquisition process, processing is performed to set a state (GS=2) for substituting the gear speed that corresponds to the acceleration gear ratio Sa for N and switching to the gear speed that corresponds to the acceleration gear ratio Sa.

In the gear ratio acquisition process, the control unit 20 substitutes the gear speed that corresponds to the acceleration gear ratio Sa for the variable N (S800). Namely, the control unit 20 uses the processing of the vehicle speed information obtaining unit 21a, the required acceleration obtaining unit 21b, and the acceleration gear ratio obtaining unit 21c to compute the acceleration gear ratio Sa. More specifically, the control unit 20 acquires the target vehicle speed $V_0$, the recommended vehicle speed $V_1$, and the acceleration a as specified in FIG. 4A.

The control unit 20 then refers to the map information 30a to acquire the throttle opening $Th_1$ at the start point Re of the acceleration zone Za, and identifies the gear ratio based on the acceleration a and the target vehicle speed $V_0$. In the present embodiment, when the vehicle speed of the host vehicle is the target vehicle speed $V_0$ and the throttle opening $Th_1$ is used, torques $Tr_1$ to $Tr_6$ (where 1 to 6 correspond to gear ratios) that are output at the respective gear ratios are compared with a torque Tra that corresponds to the acceleration a.

Therefore, the control unit 20 first acquires the torque Tra that corresponds to the acceleration a as, for example, acceleration×vehicle weight×tire radius/differential gear ratio. Meanwhile, the control unit 20 acquires the engine rotational speed (rpm) achieved at the respective gear ratios for the target vehicle speed $V_0$ as, for example, target vehicle speed $V_0$×1000/3600/(2π×tire radius)×differential gear ratio×60×gear ratio×torque converter slip ratio. As a consequence, engine rotational speeds $Re_1$ to $Re_6$ are acquired at the target vehicle speed $V_0$ that corresponds to the gear ratios 1 to 6 (sixth to first gear speeds). In addition, the control unit 20 acquires the torques $Tr_1$ to $Tr_6$ that are capable of being output at the respective engine rotational speeds $Re_1$ to $Re_6$ and the throttle opening $Th_1$. For the torques $Tr_1$ to $Tr_6$, based on a torque characteristic map where the throttle opening $Th_1$, an engine rotational speed, and a torque are linked with each gear ratio, the torques $Tr_1$ to $Tr_6$ may be acquired that correspond to the engine rotational speeds $Re_1$ to $Re_6$.

After acquiring the torque Tra that corresponds to the acceleration a and the torques $Tr_1$ to $Tr_6$ that are output at each gear ratio as described above, the gear ratio with the least fuel consumption among the gear ratios that exceed the torque Tra is selected and set as the acceleration gear ratio Sa. As a consequence, when acceleration is performed at the acceleration a, the gear ratio can be set in order to accelerate at a gear ratio that enables the vehicle speed of the host vehicle to reach the recommended vehicle speed $V_1$, making it possible to set a gear ratio that achieves smooth acceleration. Also, the gear ratio that enables the least fuel consumption can be set as the acceleration gear ratio Sa. Note that after acquiring the acceleration gear ratio Sa, the control unit 20 substitutes a value that indicates the gear speed corresponding to the acceleration gear ratio Sa for the variable N.

The control unit 20 next executes a correction process for preventing the engine rotational speed from becoming excessively high due to setting the gear ratio to the acceleration gear ratio Sa (S805). For example, in the case where the host vehicle travels both the first zone $Zr_1$ and the second zone $Zr_2$ at the fixed second acceleration gear ratio as shown in FIG. 6B, if the second acceleration gear ratio used as the gear ratio for traveling the first zone $Zr_1$ is excessively large, setting the gear ratio to the second acceleration gear ratio will cause the engine rotational speed to excessively increase in the first zone $Zr_1$.

Hence, based on the acceleration gear ratio Sa indicated by the variable N and the first target vehicle speed $V_{01}$ of the first zone $Zr_1$, the control unit 20 estimates the engine rotational speed as, for example, target vehicle speed $V_{01}$×1000/3600/(2π×tire radius)×differential gear ratio×60×acceleration gear ratio Sa×torque converter slip ratio. Note that in the above formula, the acceleration gear ratio Sa is the first acceleration gear ratio when the process at S240 to S246 is executed, and the acceleration gear ratio Sa is the second acceleration gear ratio when the process at S230 to S236 is executed.

A correction is performed if the estimated engine rotational speed is equal to or greater than a predetermined value (e.g. 3000 rpm), but no correction is performed if the estimated engine rotational speed is less than the predetermined value. In the case of a correction, the acceleration gear ratio Sa is set such that the estimated engine rotational speed becomes less than the predetermined value. Specifically, the acceleration gear ratio Sa is successively lowered (the gear speed is raised one speed at a time) and the engine rotational speed estimated until the estimated engine rotational speed falls below the predetermined value. When the estimated engine rotational speed becomes less than the predetermined value, the gear ratio thereof is set as the acceleration gear ratio Sa and a value that indicates the gear speed corresponding to the acceleration gear ratio Sa is substituted for the variable N.

At S810 onward, the control unit 20 performs a process for setting the gear ratio control status GS to 2 at a timing that prevents the running stability of the vehicle from decreasing, and setting the gear ratio. According to this process, the control unit 20 computes a deceleration force Fad that acts on the host vehicle when the gear speed of the host vehicle is set to the gear speed that corresponds to the acceleration gear ratio Sa (S810). Here, the deceleration force Fad indicates a deceleration force (a force that acts in the rearward direction of the host vehicle) that acts on the host vehicle when traveling at the current vehicle speed and the current engine rotational speed in the gear speed that corresponds to the acceleration gear ratio Sa. For the deceleration force Fad, similar to the computation of the torques $Tr_1$ to $Tr_6$ described above, a torque that corresponds to the gear speed corresponding to the acceleration gear ratio Sa may be acquired and the deceleration force Fad computed based on the torque, the vehicle weight, and the like.

The control unit 20 then carries out a process for evaluating forces that generate slip in the host vehicle. First, the control unit 20 uses the processing of the gear ratio control unit 21d to acquire a curvature γ at a point two seconds ahead (S815). Namely, the control unit 20 estimates a point that would be two seconds ahead when the host vehicle travels at the current vehicle speed, acquires at least three shape interpolation points or nodes that are closest to the point, and acquires the curvature γ at the point based on at minimum the three shape interpolation points or nodes. The control unit 20 then acquires a friction coefficient μ of the road surface at the point two seconds ahead (S820). The road surface friction coefficient μ may be identified in advance; a pre-measured friction coefficient may be recorded in the map information 30a; a road surface friction coefficient may be estimated and set based on the weather and so forth, or a friction coefficient may be set using probe information.

Next, the control unit 20 uses the processing of the gear ratio control unit 21d to acquire a threshold LimFad for evaluating the forces that generate slip in the host vehicle (S825). In the present embodiment, the threshold LimFad is expressed as $((\mu \cdot W \cdot S)^2 - Fc(\gamma^2))^{1/2}$, where W is the weight of the host vehicle, S is a coefficient greater than zero but equal to or less than one, and Fc(γ) is a function that indicates a lateral force acting on the host vehicle when traveling on a road with the curvature 7, Note that the weight W, the coefficient S, and the function Fc(γ) are stored in advance in the storage medium 30, and the control unit 20 refers to the storage medium 30 to acquire such information and compute the threshold LimFad.

Figure 13:
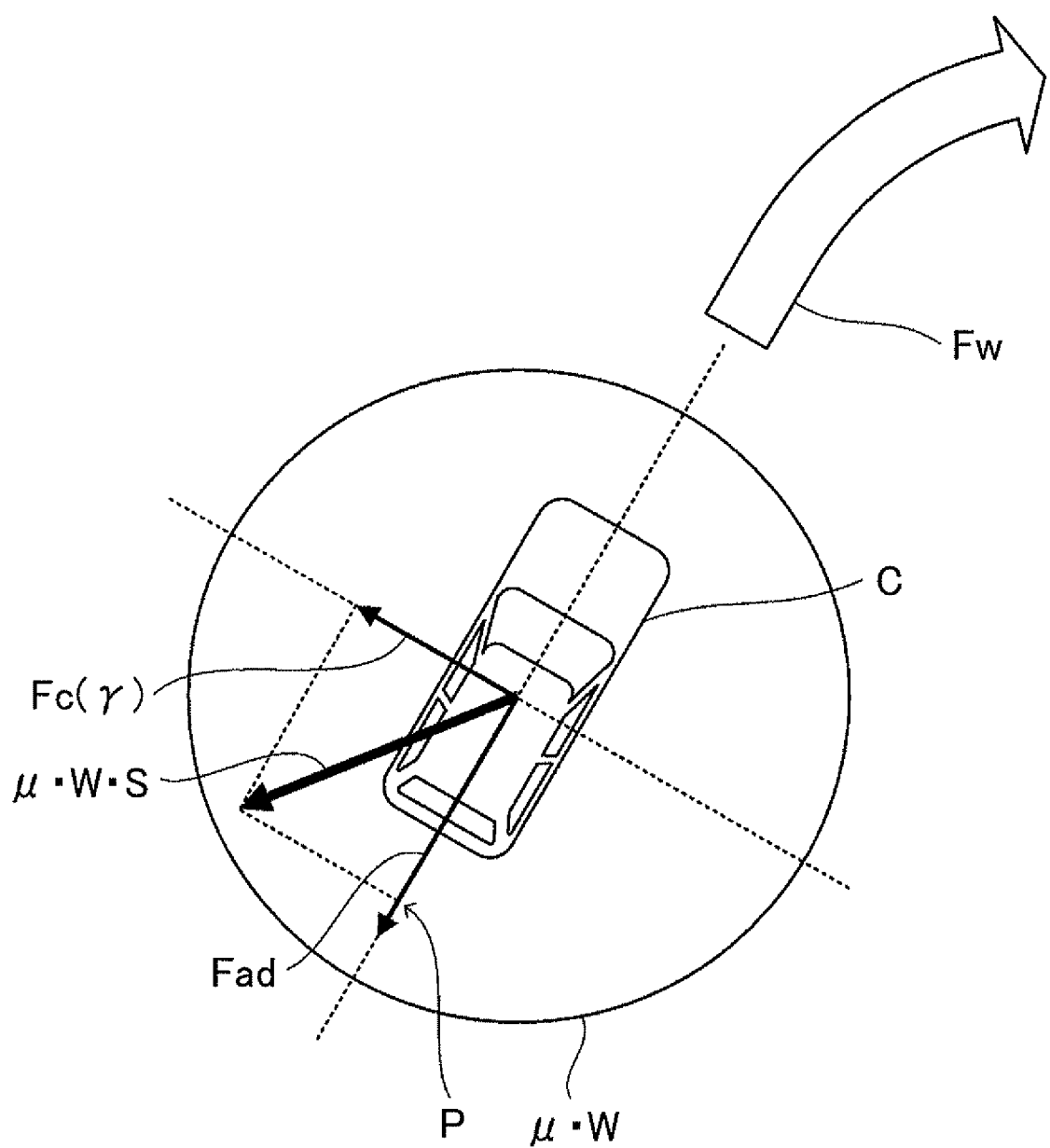
FIG. 13 is an explanatory drawing that describes forces acting on a vehicle.

FIG. 13 is an explanatory drawing that describes the deceleration force Fad and the threshold LimFad. FIG. 13 shows the host vehicle C traveling in the direction of an arrow Fw, and also shows the magnitude of a friction force μ·W acting on the host vehicle C by a solid-line circle. In FIG. 13, slip is generated in the host vehicle C when the tip of a vector that represents forces acting on the host vehicle C (a resultant force of the lateral force Fc(γ) and a deceleration force) exceeds the solid-line circle. In other words, by breaking down the friction force μ·W into the lateral force Fc(γ) and a deceleration force acting in the rearward direction of the vehicle, this deceleration force can be considered a limit deceleration force at which slip occurs.

Hence, in the present embodiment, the threshold LimFad is set to a value acquired by breaking down a value μ·W·S found as a product of the friction force μ·W and the coefficient S, which is one or less, into a force acting in the rearward direction of the vehicle based on the lateral force Fc(γ), such that a constant margin is achieved with respect to the friction force μ·W. In other words, as exemplified in FIG. 13, the host vehicle C is considered to have less running stability when the tip of a vector that represents the deceleration force Fad is closer to the outer periphery of the circle than a position P that corresponds to the tip of a component vector of a vector μ·W·S.

Therefore, the control unit 20 determines whether the deceleration force Fad is greater than the threshold LimFad (S830). If it is determined that the deceleration force Fad is not greater than the threshold LimFad, then the control unit 20 determines whether the point two seconds ahead is past the start point Rs of the curve zone Zr (S835). If it is determined that the point two seconds ahead is not past the start point Rs, then the control unit 20 returns to the process shown in FIG. 11. However, if it is determined at S830 that the deceleration force Fad is greater than the threshold LimFad, or if it is determined at S835 that the host vehicle is past the start point Rs of the curve zone Zr, then the control unit 20 sets the gear ratio control status GS to 2 in order to carry out setting of the gear ratio (S840).

Accordingly, once the gear ratio control status GS is set to 2 following S830 and the process that sets the gear ratio at S730 is performed following the determination at S715, the gear ratio is set to the acceleration gear ratio Sa before the forces acting on the host vehicle become forces that generate slip in the host vehicle. Thus, setting the gear ratio to the acceleration gear ratio Sa makes it possible to set the gear ratio such that slip is not generated in the host vehicle, and enables setting of the gear ratio while also suppressing the effect of shifting on vehicle behavior. It should be noted here that the present invention is not limited to the above configuration, provided that it is possible to evaluate whether the forces acting on the front of the host vehicle will become forces that generate slip. In addition to the configuration as described above, where the forces are evaluated at a time subsequent to the current time by a predetermined interval, a configuration may be used where the forces are evaluated at a position ahead of the current position by a predetermined distance. Further note that the "two seconds" at S815 and S835 is only an example; any value may be used provided that the value is greater than the time required for the gear shift control unit 21d to output the control signal for setting the gear ratio to the acceleration gear ratio Sa to the gear shift portion 44 and complete switching of the gear ratio by the gear shift portion 44 in accordance with the control signal. For example, at S835, any time may be used provided that the gear ratio can be switched to the acceleration gear ratio Sa before the host vehicle reaches the start point Rs. Obviously, a configuration may be adopted that uses the forces at a position ahead of the current position by a predetermined distance as described above in order to evaluate the forces at a time subsequent to the current time by a predetermined interval, and in such case, the predetermined distance is a distance greater than the distance traveled from the start of the process for shifting at the current position to the completion of shifting.

(3) Operation Example

According to the above process, and as shown by a bold dashed line in FIG. 2, once the host vehicle C traveling in sixth speed on the road prior to the deceleration zone Zd approaches the curve zone Zr, the deceleration control is executed and the vehicle speed is set to the target vehicle speed $V_0$ before the host vehicle C reaches the end point Rs of the deceleration zone Zd. In the deceleration zone Zd, the acceleration gear ratio Sa is computed through the gear ratio acquisition process. Furthermore, the curvature γ of the road two seconds ahead of the host vehicle C is acquired through the gear ratio acquisition process. Once the curvature γ increases and the deceleration force Fad exceeds the threshold LimFad, the deceleration control status GS is set to 2. Therefore, if the acceleration gear ratio Sa is a gear ratio that corresponds to the third gear speed, for example, then the gear speed becomes the third speed according to the process at S730. Thus, as shown by a bold dashed-dotted line in FIG. 2, the gear speed in the deceleration zone Zd thereafter, as well as in the curve zone Zr and the acceleration zone Za, is maintained to the third speed, which enables smooth acceleration when acceleration is started in the acceleration zone Za.

Figure 14A:
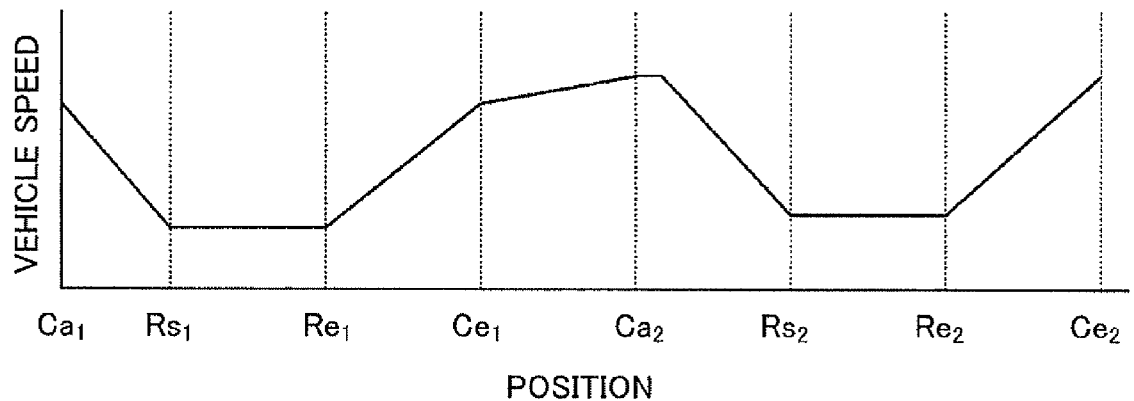
FIGS. 14A, 14B, and 14C are schematic diagrams that show changes in vehicle speed.

As FIG. 2 illustrates, when the first zone and the second zone are separated (when the start point $Ca_2$ of the second deceleration zone $Zd_2$ is farther ahead than the end point $Ce_1$ of the first acceleration zone $Za_1$ in the traveling direction of the host vehicle), the acceleration control is ended by the host vehicle C reaching the end point $Ce_1$ of the first acceleration zone $Za_1$. Accordingly, the gear ratio that corresponds to the fourth gear speed as shown in FIG. 2, for example, may also be set due to subsequent travel. If the host vehicle C approaches the second zone $Zr_2$ in such a state, the gear ratio of the host vehicle in the second deceleration zone $Zd_2$ is set to the second acceleration gear ratio in order to accelerate the host vehicle after traveling the second zone $Zr_2$. Consequently, in a case where the second acceleration gear ratio is the gear ratio that corresponds to third speed, as shown in FIG. 2 the host vehicle shifts to third speed in the second deceleration zone $Zd_2$ and keeps traveling in third speed until the end point $Ce_2$ of the second acceleration zone $Za_2$. FIG. 14A is a figure that schematically shows the change in vehicle speed when traveling a road such as that shown in FIG. 2.

Meanwhile, as FIG. 6 shows, when the first zone and the second zone are continuous over a short distance, a process is performed to achieve smooth acceleration between the first zone and the second zone. The situation shown in FIG. 6A will be described here, wherein the end point $Re_1$ of the first zone $Zr_1$ is closer than the start point $Ca_2$ of the second deceleration zone $Zd_2$ to the host vehicle C. In this case, the process shown in FIG. 3 and the like is executed while the host vehicle C travels the first deceleration zone $Zd_1$. At such time, the parameters associated with the first zone are substituted for the target vehicle speed $V_0$ and the like (S200 to S206), and the end point $Ce_1$ of the first acceleration zone $Za_1$ is corrected at S218 after the determination at S210. Due to execution of the processes at S240 to S246 onward after the determination at S225, the recommended vehicle speed $V_1$ and the acceleration a are corrected to Vz and $a_1'$, respectively.

Next, once the processes at S130 and S140 are executed, the parameters corrected at S120 are used in the deceleration and acceleration of the host vehicle C associated with the first zone $Zr_1$. Thus, the host vehicle C is decelerated by setting the gear ratio of the host vehicle C to the first acceleration gear ratio that corresponds to the post-correction parameters during travel in the first deceleration zone $Zd_1$. After traveling the first zone $Zr_1$, the host vehicle C is accelerated using the first acceleration gear ratio until the host vehicle C reaches the post-correction end point $(Ce_1)$ of the first acceleration zone $Za_1$. Once the host vehicle reaches the post-correction end point $(Ce_1)$ of the first acceleration zone $Za_1$, the gear ratio control status GS and the acceleration control status AS are both set to 0 after the process at S735.

Figure 14B:
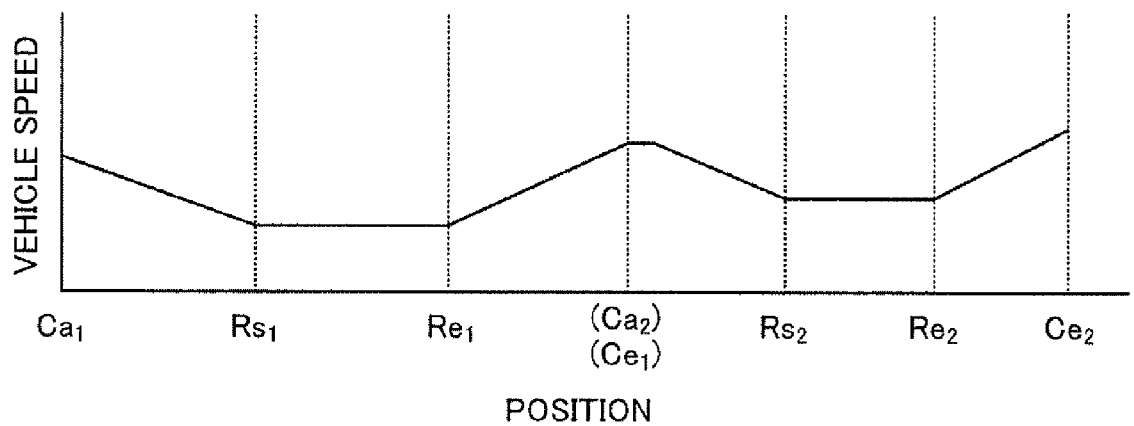

Accordingly, the control unit 20 initiates the process at S110 onward for the second zone $Zr_2$. If there are no other consecutive curve zones following the second zone, the target vehicle speed $V_0$ and the like are set using the parameters that are associated with the second zone $Zr_2$, which is the curve zone immediately ahead during the process shown in FIGS. 4A and 4B, and none of the parameters are corrected. In such case, deceleration is initiated in the second deceleration zone $Zd_2$ after the process at S415 or S420. In addition, the second acceleration gear ratio is set after the process at S705 in the second deceleration zone $Zd_2$, and after S830 or S835 the gear ratio control status GS is set to 2 and the acceleration gear ratio of the host vehicle C becomes the second acceleration gear ratio. Thus, the host vehicle C is decelerated by setting the gear ratio of the host vehicle C to the second acceleration gear ratio during travel in the second deceleration zone $Zd_2$. After traveling the second zone $Zr_2$, the host vehicle C is accelerated using the second acceleration gear ratio until the host vehicle C reaches the post-correction end point $(Ce_2)$ of the second acceleration zone $Za_2$, FIG. 14B is a figure that schematically shows the change in vehicle speed when traveling a road such as that shown in FIG. 6A.

The situation shown in FIG. 6B will be described here, wherein the start point $Ca_2$ of the second deceleration zone $Zd_2$ is closer than the end point $Re_1$ of the first zone $Zr_1$ to the host vehicle C. In this case, the parameters associated with the first zone are substituted for the target vehicle speed $V_0$ and the like similar to FIG. 6A while the host vehicle C travels the first deceleration zone $Zd_1$ (S200 to S206), and the end point $Ce_1$ of the first acceleration zone $Za_1$ is corrected at S218 after the determination at S210. Due to execution of the processes at S230 to S236 after the determination at S225, the target vehicle speed $V_0$ and the acceleration a are corrected to Va' and $a_2$, respectively.

Next, once the processes at S130 and S140 are executed, the parameters corrected at S120 are used in the deceleration and acceleration of the host vehicle C associated with the first zone $Zr_1$. Unless the acceleration gear ratio is corrected at S805, the gear ratio of the host vehicle C during travel through the first deceleration zone $Zd_1$ is set to the second acceleration gear ratio that corresponds to the acceleration $a_2$ to decelerate the host vehicle C. Furthermore, in the example shown in FIG. 6B, the host vehicle C reaches the post-correction end point ($Ce_1$) of the first acceleration zone $Za_1$ before reaching the end point $Re_1$ of the first zone $Zr_1$. Therefore, the gear ratio control status GS and the acceleration control status AS are set to 0 following the process at S735 before the host vehicle C reaches the end point $Re_1$ of the first zone $Zr_1$. Next, the process at S110 onward is executed again and the gear ratio control status GS is set to 1 following the process at S705, after which the process for the second zone $Zr_2$ is initiated.

Note that although the deceleration control status DS is set to 0 once the end point $Re_1$ of the first zone $Zr_1$ is reached (S615), the process at S625 is skipped after executing the process at S620 and therefore the acceleration control status AS is not set to 1. For this reason, the host vehicle does not accelerate once past the end point $Re_1$ of the first zone $Zr_1$. When executing the process at S110 onward again, if there are no other consecutive curve zones following the second zone, the target vehicle speed $V_0$ and the like are set using the parameters that are associated with the second zone, which is the curve zone immediately ahead during the process shown in FIGS. 4A and 4B, and none of the parameters are corrected. Accordingly, the deceleration control is performed in the second deceleration zone $Zd_2$, the vehicle speed restriction control in the second zone $Zr_2$, and the acceleration control in the second acceleration zone $Za_2$.

Figure 14C:
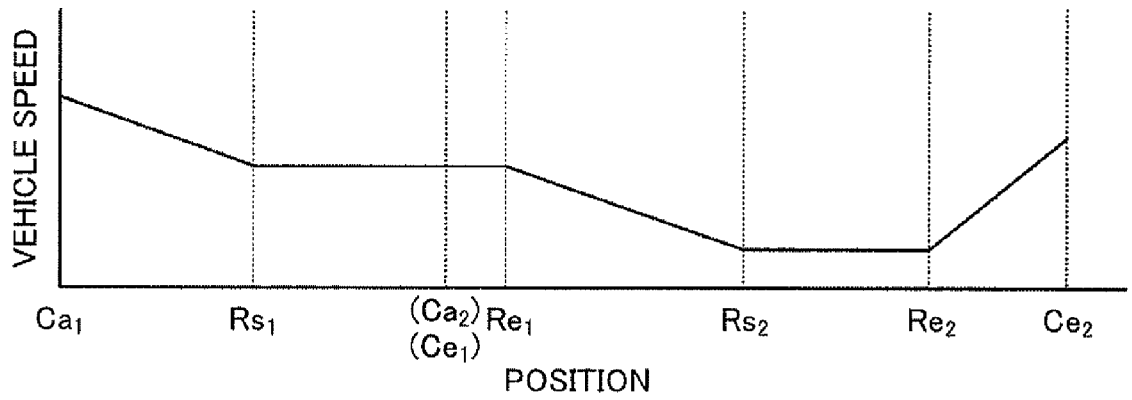

During the course of this process the acceleration gear ratio is set at S735, that is, the acceleration gear ratio is set to the second acceleration gear ratio which is the same acceleration gear ratio set in the first deceleration zone $Zd_1$. Thus, the gear ratio is not changed while traveling the second deceleration zone $Zd_2$; after the gear ratio is set to the second acceleration gear ratio in the first deceleration zone $Zd_1$, the gear ratio remains set to the second acceleration gear ratio until the host vehicle passes the end point $Ce_2$ of the second acceleration zone $Za_2$. FIG. 14C is a figure that schematically shows the change in vehicle speed when traveling a road such as that shown in FIG. 6B.

(4) Other Embodiments

The present embodiment described above is only an illustrative example for practicing the present invention, and various other embodiments may also be used so long as a control is executed for setting the gear ratio of the host vehicle to the second acceleration gear ratio while traveling in the first acceleration gear ratio. The parameters associated with the first zone and the second zone are not limited provided that they can be set in advance or specified according to preset rules. In addition, various other configurations may also be adopted provided that such configurations determine whether deceleration is required depending on the amount of deceleration (deceleration and torque) needed and the vehicle speed in each zone.

Furthermore, the applicability of the present invention is not limited to a curve zone; the present invention may also be applied to a road with a grade. For example, a section that includes a grade is defined as a grade section and a target vehicle speed when the host vehicle reaches the grade section and a recommended vehicle speed subsequent to traveling the grade section are defined. Accordingly, a required acceleration can be specified in the same manner as in the configuration described above and an acceleration gear ratio acquired; the acceleration gear ratio is then reached at a phase before the grade section. Note that the target vehicle speed in such a configuration can be defined as a vehicle speed when decelerating before a start point of a downgrade to a desirable vehicle speed for traveling the downgrade section.

Moreover, the present invention is not limited to a configuration that acquires the gear ratio corresponding to the required acceleration; various other configurations may be adopted so long as a gear ratio capable of accelerating to a vehicle speed faster than the target vehicle speed can be determined. For example, a configuration may be used that learns in advance a rotational speed of a drive source (an engine or a motor) that corresponds to a throttle opening/closing operation after traveling a predetermined section such as a curve section, rotates the drive source at the learned rotational speed after the host vehicle travels the predetermined section, and specifies an acceleration gear ratio for accelerating to a vehicle speed faster than the target vehicle speed. In other words, various other configurations are possible even if a recommended vehicle speed is not specified, provided that the vehicle speed of the host vehicle after traveling the predetermined section can be accelerated to a vehicle speed faster than the target vehicle speed.

The acceleration gear ratio is not limited provided that it is at least a sufficient gear ratio required for acceleration to a vehicle speed faster than the target vehicle speed, and the gear ratio may be determined in advance to achieve smoother acceleration. For example, a parameter such as the throttle opening/closing operation at the start of acceleration, or the rotational speed of the host vehicle drive source may be estimated, and a gear ratio or the like that enables the most efficient acceleration based on the estimation can be selected. For the deceleration control, a configuration that carries out a feedback control based on the deceleration as described above or carries out a feedback control based on the vehicle speed may also be adopted.

The required acceleration may be any parameter for evaluating energy output by the host vehicle for transitioning the vehicle speed from the target vehicle speed to the recommended vehicle speed, and is not limited to the acceleration a described above. For example, a torque, engine output, or the like may be used. The above embodiment has a configuration in which the deceleration control is performed when the required deceleration Gr exceeds the thresholds LimG_h and LimG_L. Obviously, however, other configurations such as starting deceleration after passing the start point Ca of the deceleration zone Zd may be employed.

The vehicle speed restriction process is configured such that deceleration is performed when the current vehicle speed Vc exceeds the target vehicle speed $V_0$. However, a configuration in which acceleration is performed when the current vehicle speed Vc falls below the target vehicle speed $V_0$ is also acceptable. Furthermore, in the above embodiment, the gear ratio with the least fuel consumption is selected among the gear ratios capable of output that exceeds the torque Tra that corresponds to the required acceleration a, and set as the acceleration gear ratio Sa. However, the acceleration gear ratio may be determined based on a different concept. For example, the torque Tra that corresponds to the required acceleration a and the torques $Tr_1$ to $Tr_6$ that are output at each gear ratio may be acquired, and the gear ratio with the least fuel consumption among the gear ratios that exceed the torque Tra may be set as the acceleration gear ratio Sa.

In other words, the acceleration gear ratio is designated as a gear ratio capable of transitioning the vehicle speed of the host vehicle to the recommended vehicle speed $V_1$ when accelerating at the required acceleration a while maintaining the gear ratio, and is a gear ratio that decreases the engine rotational speed that corresponds to the throttle opening $Th_1$ with a minimum degree of reduction in the rotational speed when transmitted to the output side. According to this configuration, the host vehicle can be accelerated from the target vehicle speed $V_0$ to the recommended vehicle speed $V_1$ while suppressing an increase in the engine rotational speed as much as possible, while enables efficient acceleration. Note that, while an engine rotational speed corresponding to the throttle opening $Th_1$ is assumed here, the rotational speed may obviously be determined based on a statistical value or the like.

In the above embodiment, the vehicle speed Vz is acquired by multiplying the vehicle speed at the intersection point of the acceleration curve and the deceleration curve by a predetermined coefficient. However, in another configuration where the amount of the predetermined coefficient can be selected from a plurality of amounts (e.g. three different types), the threshold used in the acceleration gear ratio correction process above may be changed depending on the amount of the coefficient. In other words, a configuration may be used where a smaller coefficient is accompanied by a smaller threshold for the engine rotational speed. For example, if the coefficients correspond in order of smallest first to an emphasis on safety, smoothness, and sporty driving, the thresholds that correspond to the respective coefficients may be set to 2500 rpm, 3000 rpm, and 3500 rpm.

What is claimed is:

1. A driving support device for obtaining and setting acceleration gear ratios that facilitate a first acceleration of a host vehicle after the host vehicle has decelerated into a first zone, and that facilitate a second acceleration of the host vehicle when the host vehicle must decelerate into a second zone following the first acceleration comprising:
    an acceleration gear ratio obtaining unit that acquires a first acceleration gear ratio for accelerating a host vehicle in a first acceleration zone following the first zone, and that acquires a second acceleration gear ratio for accelerating the host vehicle in a second acceleration zone following the second zone; and
    a gear ratio control unit that executes a control for setting the gear ratio of the host vehicle to the first acceleration gear ratio when the host vehicle is in a first deceleration zone in order to decelerate the host vehicle before entering the first zone, and that further executes a control, while the host vehicle is traveling in the first acceleration gear ratio, for setting the gear ratio of the host vehicle to the second acceleration gear ratio when the host vehicle must decelerate before entering the second zone.

2. The driving support device according to claim 1, wherein the acceleration gear ratio obtain unit acquires the first acceleration gear ratio based on a first required acceleration for accelerating the host vehicle from a first target vehicle speed for traveling the first zone to a first recommended vehicle speed after traveling the first zone, and acquires the second acceleration gear ratio based on a second required acceleration for accelerating the host vehicle from as second target vehicle speed for traveling the second zone to a second recommended vehicle speed after traveling the second zone.

3. The driving support device according to claim 1, wherein:
    the acceleration gear ratio obtaining unit acquires for each point a speed when accelerating the host vehicle at a first required acceleration in order to accelerate the host vehicle form a first target vehicle speed for traveling the first zone to a first recommended vehicle speed after traveling the first zone, and a speed when slowing the host vehicle at a predetermined deceleration such that the host vehicle reaches a second target vehicle speed for traveling the second zone at a start point of the second zone;
    acquires a point of coincidence where the speed when accelerating the host vehicle at the first required acceleration and the speed for reaching the second target vehicle speed coincide;
    performs a correction that sets the point of coincidence as a post-correction end point of the first acceleration zone, and a correction that multiples the speed for accelerating the host vehicle at the first required acceleration at the point of coincidence by a predetermined coefficient and sets the product thereof as a post-correction first recommended vehicle speed;
    acquires a required acceleration for accelerating the host vehicle from the first target vehicle speed to the post-correction first recommended vehicle speed within a distance ranging from an end point of the first zone to the post-correction end point of the first acceleration zone; and
    performs a correction that sets the required acceleration as a post-correction first required acceleration.

4. The driving support device according to claim 1, wherein the first zone and the second zone are, respectively, a first curve zone and a second curve zone.

5. A driving support method for obtaining and setting acceleration gear ratios that facilitate a first acceleration of a host vehicle after the host vehicle has decelerated into a first zone, and that facilitate a second acceleration of the host vehicle when the host vehicle must decelerate into a second zone following the first acceleration, said method comprising the steps of:
    an acceleration gear ratio obtaining unit acquiring a first acceleration gear ratio for accelerating a host vehicle in a first acceleration zone following the first zone;
    the acceleration gear ratio obtaining unit acquiring a second acceleration gear ratio for accelerating the host vehicle in a second acceleration zone following the second zone;
    a gear ratio control unit executing a control for setting the gear ratio of a transmission of the host vehicle to the first acceleration gear ratio when the host vehicle is in a first deceleration zone in order to decelerate the host vehicle before entering the first zone; and
    the gear ratio control unit executing a control for setting the gear ratio of the transmission of the host vehicle to the second acceleration gear ratio when the host vehicle must decelerate with respect to the second zone while traveling in the first acceleration gear ratio.

6. A non-transitory, computer-readable medium encoded with a driving support program for obtaining and setting acceleration gear ratios that facilitate a first acceleration of a host vehicle after the host vehicle has decelerated into a first zone, and that facilitate a second acceleration of the host vehicle when the host vehicle must decelerate into a second zone following the first acceleration, said driving support program causing a computer to execute the steps of:

acquiring a first acceleration gear ratio for accelerating a host vehicle in a first acceleration zone following the first zone;
acquiring a second acceleration gear ratio for accelerating the host vehicle in a second acceleration zone following the second zone;
executing a control for setting the gear ratio of the host vehicle to the first acceleration gear ratio when the host vehicle is in a first deceleration zone in order to decelerate the host vehicle before entering the first zone; and
executing a control for setting the gear ratio of the host vehicle to the second acceleration gear ratio when the host vehicle must decelerate with respect to the second zone while traveling in the first acceleration gear ratio.

* * * * *